US012666368B2

(12) United States Patent (10) Patent No.: US 12,666,368 B2
Iwatani et al. (45) Date of Patent: Jun. 23, 2026

(54) INTERFERENCE CONTROL SYSTEM, INTERFERENCE CONTROL METHOD, REPEATER AND PROGRAM FOR INTERFERENCE CONTROL FOR WIRELESS COMMUNICATIONS

(71) Applicant: NTT, Inc., Tokyo (JP)

(72) Inventors: Junichi Iwatani, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 328 days.

(21) Appl. No.: 18/565,538

(22) PCT Filed: Jun. 8, 2021

(86) PCT No.: PCT/JP2021/021804
§ 371 (c)(1),
(2) Date: Nov. 30, 2023

(87) PCT Pub. No.: WO2022/259388
PCT Pub. Date: Dec. 15, 2022

(65) Prior Publication Data
US 2024/0276393 A1 Aug. 15, 2024

(51) Int. Cl.
*H04W 52/24* (2009.01)
*H04W 60/00* (2009.01)
(Continued)

(52) U.S. Cl.
CPC ..... *H04W 52/243* (2013.01); *H04W 72/0453* (2013.01); *H04W 72/0473* (2013.01); *H04W 72/56* (2023.01); *H04W 60/00* (2013.01)

(58) Field of Classification Search
CPC ........... H04W 52/243; H04W 72/0453; H04W 72/0473; H04W 72/56; H04W 60/00;
(Continued)

(56) References Cited

U.S. PATENT DOCUMENTS

2021/0168618 A1* 6/2021 Yavuz ................... H04W 84/18

FOREIGN PATENT DOCUMENTS

WO WO-2019142440 A1 * 7/2019 ............ H04W 72/04

OTHER PUBLICATIONS

WO 2021/100601 A1, Furuichi, Information processing device, information processing method, and communication device, May 27, 2021, all (Year: 2021).*

(Continued)

*Primary Examiner* — Curtis A Kuntz
(74) *Attorney, Agent, or Firm* — XSENSUS LLP

(57) ABSTRACT

The interference control system provides a control device disposed in a public network with a resource application based on a message issued regarding use of a wireless resource by an interfering device disposed in a carrier network. A response based on a message issued by the control device in response to the resource application is provided to the interfering device that has issued the resource application. A repeater estimates, on the basis of interfered-with device information, an increase amount in the total amount of interference caused in each of used frequency channels of the interfered-with device in a case where the interfering device performs transmission in each of frequency channels with a prescribed transmission power. An estimation result of the increase amount is reflected in at least one of the resource application from the interfering device and the response to the interfering device.

8 Claims, 21 Drawing Sheets

(51) Int. Cl.
*H04W 72/044* (2023.01)
*H04W 72/0453* (2023.01)
*H04W 72/56* (2023.01)

(58) Field of Classification Search
CPC ..... H04W 16/14; H04W 88/12; H04W 52/24;
H04W 52/283; H04W 52/244
See application file for complete search history.

(56) References Cited

OTHER PUBLICATIONS

"Spectrum Access System (SAS)—Citizens Broadband Radio Service Device (CBSD) Interface Technical Specification", WINNF-TS-0016, Version V1.2.6, Nov. 25, 2020, 60 pages.

* cited by examiner

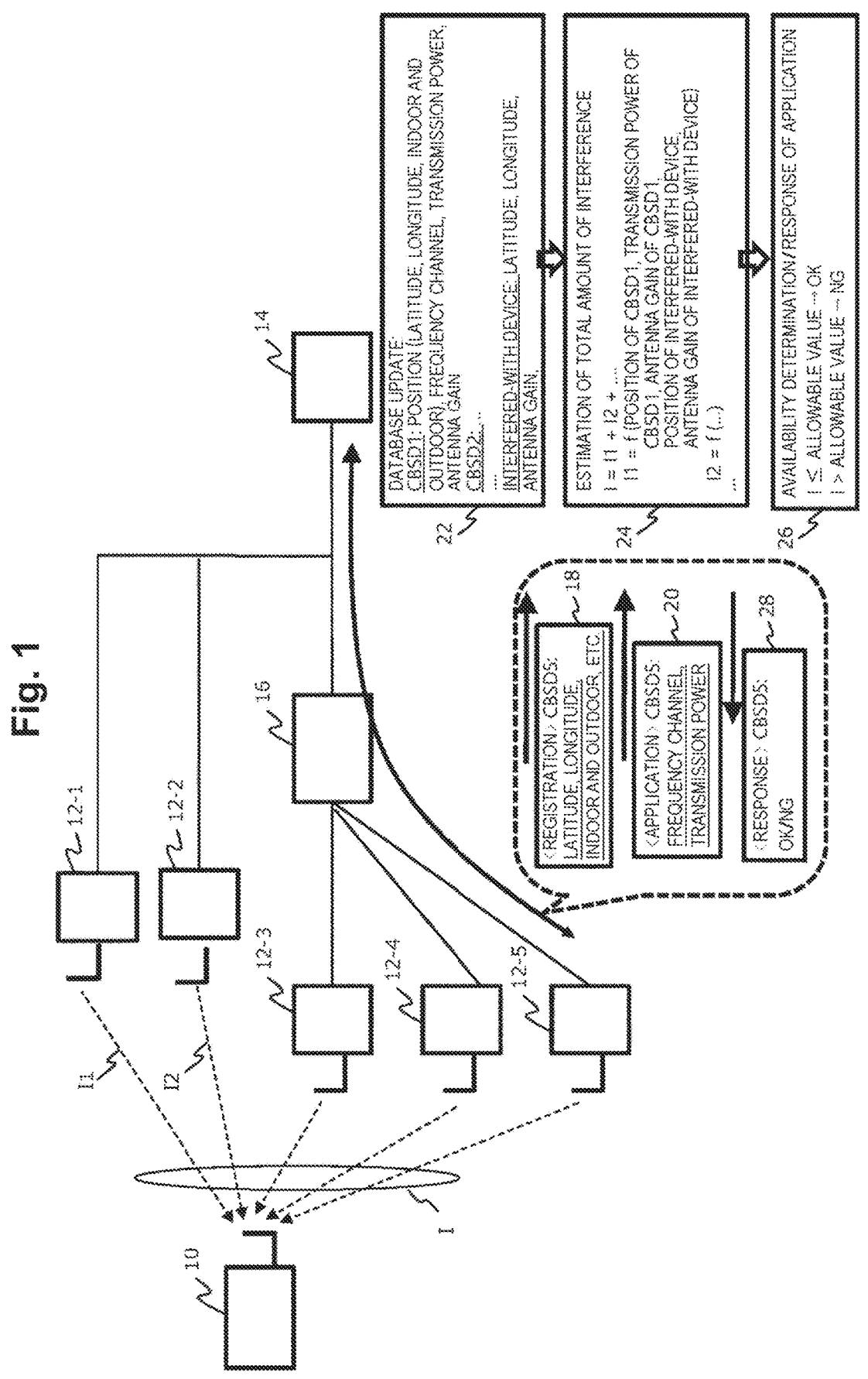

Fig. 1

DATABASE UPDATE:
CBSD1: POSITION (LATITUDE, LONGITUDE, INDOOR AND OUTDOOR), FREQUENCY CHANNEL, TRANSMISSION POWER, ANTENNA GAIN
CBSD2: ...

INTERFERED-WITH DEVICE: LATITUDE, LONGITUDE, ANTENNA GAIN,

ESTIMATION OF TOTAL AMOUNT OF INTERFERENCE
I = I1 + I2 + ...
I1 = f (POSITION OF CBSD1, TRANSMISSION POWER OF CBSD1, ANTENNA GAIN OF CBSD1, POSITION OF INTERFERED-WITH DEVICE, ANTENNA GAIN OF INTERFERED-WITH DEVICE)
I2 = f (..)
...

AVAILABILITY DETERMINATION/RESPONSE OF APPLICATION
I ≤ ALLOWABLE VALUE → OK
I > ALLOWABLE VALUE → NG

<REGISTRATION> CBSDS:
LATITUDE, LONGITUDE,
INDOOR AND OUTDOOR, ETC.

<APPLICATION> CBSDS:
FREQUENCY CHANNEL,
TRANSMISSION POWER

<RESPONSE> CBSDS:
OK/NG

Fig. 17

| FREQUENCY CHANNEL | RESOURCE REMAINING AMOUNT | UPDATE TIME |
|---|---|---|
| 1 | a [dBm] | YY/MM/DD, hh:mm:ss |
| 2 | b [dBm] | YY/MM/DD, hh:mm:ss |
| 3 | c [dBm] | YY/MM/DD, hh:mm:ss |
| 4 | d [dBm] | YY/MM/DD, hh:mm:ss |
| 5 | NO RESTRICTION | YY/MM/DD, hh:mm:ss |

INTERFERENCE CONTROL SYSTEM, INTERFERENCE CONTROL METHOD, REPEATER AND PROGRAM FOR INTERFERENCE CONTROL FOR WIRELESS COMMUNICATIONS

CROSS-REFERENCE TO RELATED APPLICATION

The present application is based on PCT filing PCT/JP2021/021804, filed Jun. 8, 2021, the entire contents of which are incorporated herein by reference.

TECHNICAL FIELD

This disclosure relates to an interference control system, an interference control method, a repeater and a program for interference control for wireless communications, and more particularly, to an interference control system, an interference control method, a repeater and a program for interference control for wireless communication suitable for limiting the total amount of interference to which an interfered-with device to be protected is subjected by a large number of interfering devices having a wireless communication function.

BACKGROUND ART

As a technology on the premise of a mixture of an interfered-with device to be protected and a plurality of interfering devices that emit interference signals, a citizens broadband radio service (CBRS) proposed in the United States is known. More specifically, the CBRS is a technology of wireless communication having a function of reducing the total amount of interference with respect to the interfered-with device in a case where the interfered-with device and the interfering device use the same frequency band. Non Patent Literature 1 below describes a technical standard related to CBRS.

In the CBRS, for example, each of an interfered-with device used by the government and a plurality of interfering devices (CBSD: citizens broadband radio service device) for use in the private sector preregister their position information in a control device (SAS: spectrum access system) via a network. The position information described above includes information indicating the latitude and the longitude of each of the interfering devices and whether the devices are installed indoors or outdoors.

Each of the interfering devices transmits an application for use of wireless resources including a frequency to be used and a transmission power to the control device. The control device that has received the application for use estimates the total amount of interference to which the interfered-with device is subjected by all the interfering devices. The total amount of interference is calculated from position information registered in advance for each of the interfered-with device and the interfering device, and an antenna gain, a transmission power, and the like of each device. Then, the control device determines whether or not the application for use is possible depending on whether or not an estimated value of the total amount of interference falls within an allowable value, and returns a result of the determination to the interfering device as a response.

Note that, in the CBRS, the application and the response between the interfering device and the control device may be directly exchanged, or may be exchanged via a repeater (domain proxy).

CITATION LIST

Non Patent Literature

Non Patent Literature 1: CBRS Baseline Standards, WINNF-TS-0016, CBRS WInnForum Standards, 25 Nov. 2020, https://cbrs.wirelessinnovation.org/release-1-of-the-baseline-standard-specifications

SUMMARY OF INVENTION

Technical Problem

In optical access services provided by communication carriers, a large number of subscribers use wireless devices such as wireless LAN access points. Similarly to interfering devices in the CBRS, the wireless devices may be an interference source with respect to the interfered-with device to be protected.

In a case where the CBRS technology is applied to the above optical access service, it is assumed that a control device that controls the total amount of interference is installed outside a network of a communication carrier that provides the service. Then, in a case where the wireless device of the subscriber freely issues an application for use to the control device without receiving any adjustment, there is a likelihood that useless processing will frequently occur, for example, an application for a congested frequency channel being made and the application being rejected. Furthermore, there is a case where the amount of interference is greatly increased by selecting the frequency channel without considering the position of the interfered-with device or the like, such as using the same frequency channel as the interfered-with device by the interfering device being located near the interfered-with device.

The present disclosure has been made in view of the above problems, and a first object of the present disclosure is to provide an interference control system for wireless communication capable of suppressing useless applications and providing good communication quality without causing a large amount of interference by giving priority to an interfering device for applying on a frequency channel that is less likely to interfere with communication of an interfered-with device.

In addition, a second object of the present disclosure is to provide an interference control method for wireless communication capable of suppressing useless applications and providing good communication quality without causing a large amount of interference by giving priority to an interfering device for applying on a frequency channel that is less likely to interfere with communication of an interfered-with device.

In addition, a third object of the present disclosure is to provide a repeater for wireless communication capable of suppressing useless applications and providing good communication quality without causing a large amount of interference by giving priority to an interfering device for applying on a frequency channel that is less likely to interfere with communication of an interfered-with device.

In addition, a fourth object of the present disclosure is to provide an interference control program for wireless communication capable of suppressing useless applications and providing good communication quality without causing a large amount of interference by giving priority to an interfering device for applying on a frequency channel that is less likely to interfere with communication of an interfered-with device.

Solution to Problem

In order to achieve the above objects, it is to be desired that a first aspect is an interference control system for wireless communication, the interference control system including a control device that controls an amount of interference to which an interfered-with device whose wireless communication is to be protected is subjected by a plurality of interfering devices that perform wireless communication, in which a repeater disposed between the interfering device and the control device includes a processor unit and a memory storing a program executed by the processor unit, and the processor unit executes:

a process of providing a control device disposed in a public network with a resource application based on a message issued regarding use of a wireless resource by an interfering device disposed in a carrier network;

a process of providing a response based on a message issued by the control device in response to the resource application to the interfering device that has issued the resource application;

a process of acquiring registration information about some or all of used frequency channels, a position, an antenna gain, and an allowable amount of interference of the interfered-with device;

a process of acquiring information about some or all of a position, a transmission power, an antenna gain, and available frequency channels of the interfering device;

an increase amount estimation process of estimating presence/absence of an increase or an increase amount in a total amount of interference caused in each of the used frequency channels of the interfered-with device in a case where the interfering device performs transmission in each of the frequency channels with the transmission power; and a reflection process of reflecting an estimation result of the increase amount in at least one of the resource application from the interfering device and the response to the interfering device in at least one form of limitation and correction.

Further, it is to be desired that a second aspect is an interference control method for wireless communication using a control device that controls an amount of interference to which an interfered-with device whose wireless communication is to be protected is subjected by a plurality of interfering devices that perform wireless communication, the interference control method including:

a step of providing a control device disposed in a public network with a resource application based on a message issued regarding use of a wireless resource by an interfering device disposed in a carrier network;

a step of providing a response based on a message issued by the control device in response to the resource application to the interfering device that has issued the resource application;

a step of acquiring registration information about some or all of used frequency channels, a position, an antenna gain, and an allowable amount of interference of the interfered-with device;

a step of acquiring information about some or all of a position, a transmission power, an antenna gain, and available frequency channels of the interfering device;

a step of estimating presence/absence of an increase or an increase amount in a total amount of interference caused in each of the used frequency channels of the interfered-with device in a case where the interfering device performs transmission in each of the frequency channels with the transmission power; and a step of reflecting an estimation result of the increase amount in at least one of the resource application from the interfering device and the response to the interfering device in at least one form of limitation and correction.

Further, it is to be desired that a third aspect is a repeater for wireless communication using a control device that controls an amount of interference to which an interfered-with device whose wireless communication is to be protected is subjected by a plurality of interfering devices that perform wireless communication, the repeater including:

a processor unit; and a memory storing a program executed by the processor unit, in which the processor unit executes:

a process of providing a control device disposed in a public network with a resource application based on a message issued regarding use of a wireless resource by an interfering device disposed in a carrier network;

a process of providing a response based on a message issued by the control device in response to the resource application to the interfering device that has issued the resource application;

a process of acquiring registration information about some or all of used frequency channels, a position, an antenna gain, and an allowable amount of interference of the interfered-with device;

a process of acquiring information about some or all of a position, a transmission power, an antenna gain, and available frequency channels of the interfering device;

an increase amount estimation process of estimating presence/absence of an increase or an increase amount in a total amount of interference caused in each of the used frequency channels of the interfered-with device in a case where the interfering device performs transmission in each of the frequency channels with the transmission power; and a reflection process of reflecting an estimation result of the increase amount in at least one of the resource application from the interfering device and the response to the interfering device in at least one form of limitation and correction.

Further, it is to be desired that a fourth aspect is an interference control program for wireless communication for realizing the repeater according to the third aspect, the interference control program including a program that causes a processor unit to execute:

a process of providing a control device disposed in a public network with a resource application based on a message issued regarding use of a wireless resource by an interfering device disposed in a carrier network;

a process of providing a response based on a message issued by the control device in response to the resource application to the interfering device that has issued the resource application;

a process of acquiring registration information about some or all of used frequency channels, a position, an antenna gain, and an allowable amount of interference of the interfered-with device;

a process of acquiring information about some or all of a position, a transmission power, an antenna gain, and available frequency channels of the interfering device;

an increase amount estimation process of estimating presence/absence of an increase or an increase amount in a total amount of interference caused in each of the used frequency channels of the interfered-with device in a case where the interfering device performs transmission in each of the frequency channels with the transmission power; and a reflection process of reflecting an estimation result of the increase amount in at least one of the resource application from the interfering device and the response to the interfering device in at least one form of limitation and correction.

Advantageous Effects of Invention

According to the first to fourth aspects, it is possible to reflect the increase amount in the total amount of interference in at least one of the resource application and the response. Accordingly, it is possible to give priority to the interfering device for applying on a frequency channel that is less likely to interfere with the communication of the interfered-with device, to suppress useless applications, and to provide good communication quality without causing a large amount of interference.

BRIEF DESCRIPTION OF DRAWINGS

FIG. 1 is a diagram for describing an outline of an interference control system using CBRS which is a comparative example of a system of a first embodiment of the present disclosure;

FIG. 17 is a diagram for describing an outline of the resource remaining amount table referred to in a routine illustrated in FIG. 16;

DESCRIPTION OF EMBODIMENTS

First Embodiment

Comparative Example of First Embodiment

Figure 2:
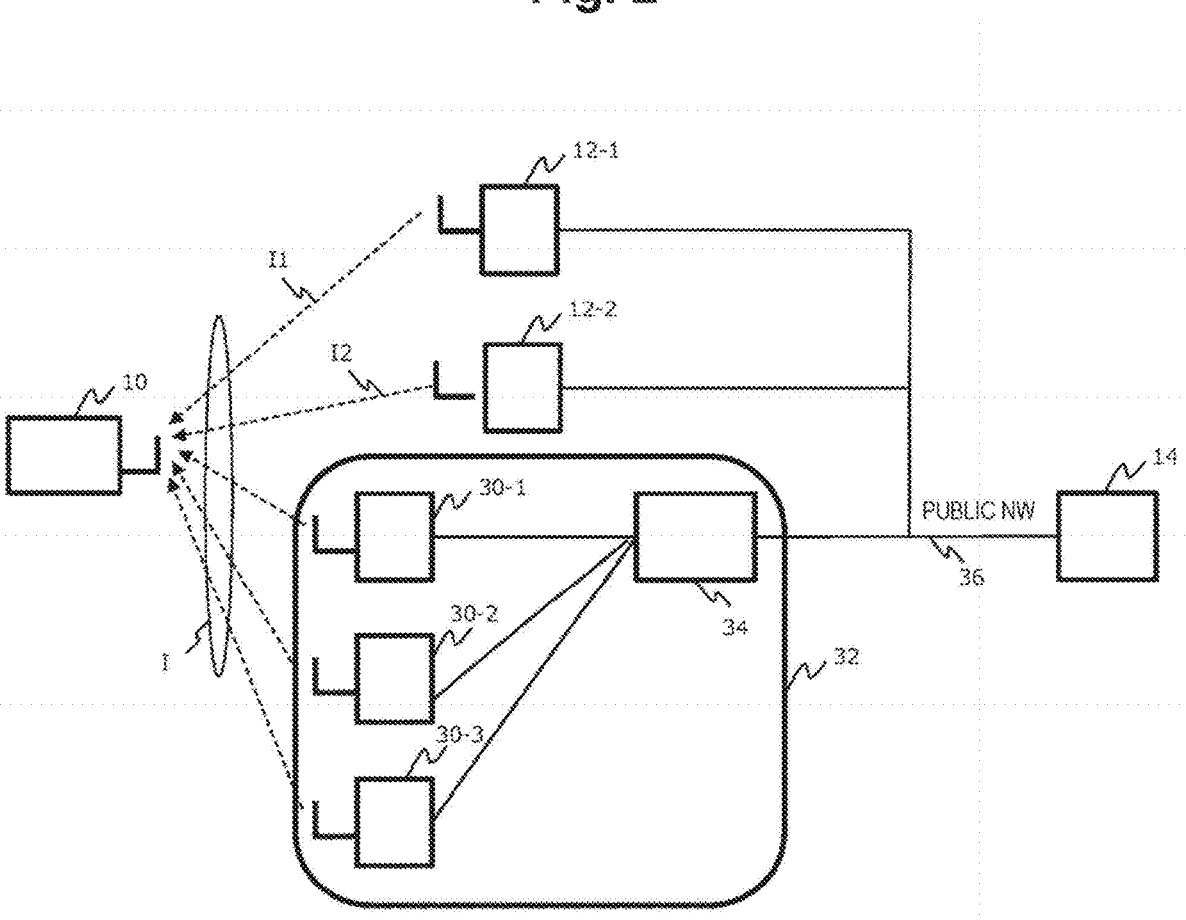
FIG. 2 is a diagram for describing an outline of the interference control system of the first embodiment of the present disclosure.

FIG. 1 is a diagram for describing an outline of an interference control system using CBRS. Hereinafter, as a comparative example of the interference control system of the first embodiment of the present disclosure, the configuration and operation of this system will be described.

The system illustrated in FIG. 1 includes an interfered-with device 10. The interfered-with device 10 is a wireless device that needs to protect communication quality, such as a radar system used by the government. The system illustrated in FIG. 1 also includes a plurality of interfering devices 12-1 to 12-5. Here, five interfering devices are illustrated. In a case where it is not necessary to distinguish the interfering devices 12-1 to 12-5 from each other, they will be hereinafter referred to as interfering devices 12 using reference numeral 12. The interfering device 12 is, for example, a wireless device assumed to be used in the private sector. The interfered-with device 10 and the interfering device 12 can use overlapping frequency bands.

A wireless signal emitted from the interfering device 12 may interfere with a wireless signal received by the interfered-with device 10. In FIG. 1, for example, the amount of interference caused by the interfering device 12-1 is represented as "I1", and the amount of interference caused by the interfering device 12-2 is represented as [I2]. In addition, the total amount of interference, which is the sum of interference caused by each interfering device 12, is represented as "I" In order to protect the communication of the interfered-with device 10, it is necessary to reduce a total amount of interference I in the frequency channel used by the inter-fered-with device 10 to an allowable value or less.

In the system illustrated in FIG. 1, some interfering devices 12-1 and 12-2 are directly connected to a control device 14 of the CBRS. In addition, the remaining interfer-ing devices 12-3 to 12-5 are connected to the control device 14 via a repeater 16. The repeater 16 can relay resource applications and responses between each of the plurality of interfering devices 12-3 to 12-5 and the control device 14.

In the system using the CBRS, each of the interfered-with device 10 and the interfering device 12 preregisters the ID, the position information, and the like of the device in the control device 14 prior to the start of communication. FIG. 1 illustrates a registration message 18 transmitted from the interfering device 12-5 to the control device 14 as an example thereof. The registration message 18 specifically includes the information described below.

1. Device ID=CBSD5
  2. Latitude and longitude of installation position of the device
  3. Information indicating whether the device is installed indoors or outdoors
  4. Antenna gain of the device After the pre-registration described above, each of the interfering devices 12 applies for a communication resource to be used toward the control device 14 when starting communication. FIG. 1 illustrates a state in which a resource application 20 including ID=CBSD5 is issued from the interfering device 12-5 to the control device 14. The resource application 20 specifically includes the information described below.

1. Frequency channel desired to be used for communica-tion
  2. Transmission power desired to be used for signal transmission A database update unit 22 is formed inside the control device 14. The database update unit 22 updates information regarding frequency usage status and the like on the basis of the information obtained by the pre-registration, the infor-mation obtained by the resource application, furthermore the information of the response generated for the resource application, and the like. Specifically, the database generated by the database update unit 22 stores the following infor-mation for each of the interfering device 12 and the inter-fered-with device 10.

<Interfering Device 12> (CBSD1 to CBSD5)
  1. Position (Latitude, Longitude, Indoor and Outdoor)
  2. Available and In-Use Frequency Channels
  3. Prescribed and In-Use Transmission Power
  4. Antenna Gain
<Interfered-with Device 10>
  1. Position (Latitude, Longitude)
  2. Antenna Gain
  3. Frequency Channel Used
  4. Allowable Amount of Interference A total interference amount estimation unit 24 is formed inside the control device 14. The total interference amount estimation unit 24 estimates the total amount of interference I received by the interfered-with device 10. Specifically, first, amounts of interference I1 to I5 caused by the inter-fering devices 12 are calculated for each frequency channel used by the interfered-with device 10. For example, the amount of interference I1 caused by the interfering device 12-1 can be calculated by a known method as a function of the position of CBSD1, the transmission power of CBSD1, and the antenna gain of CBSD1, and the position of the interfered-with device 10, and the antenna gain of the interfered-with device 10. The same applies to the amounts of interference I2 to I5 of the other interfering devices 12. The total amount of interference I in each channel is calculated by calculating the sum of the amounts of inter-ference I1 to I5 estimated or calculated in this manner for each frequency channel.

An availability determination/response unit 26 is further formed inside the control device 14. The availability deter-mination/response unit 26 determines whether the total amount of interference I estimated in response to the resource application issued by any of the interfering devices 12 is equal to or less than an allowable value of interference with respect to the interfered-with device 10. In a case where the relationship of "total amount of interference I≤allowable value" is established, it can be determined that excessive interference does not occur in the interfered-with device 10 even when the resource application is accepted. In this case, the availability determination/response unit 26 generates an OK response to the resource application. On the other hand, in a case where the relationship of "total amount of interference>allowable value" is established, it can be deter-mined that unacceptable interference occurs in the inter-fered-with device 10 when the resource application is accepted. In this case, the availability determination/re-sponse unit 26 generates an NG response to the resource application.

The response generated by the availability determination/ response unit 26 is transmitted to the interfering device 12 directly or via the repeater 16. FIG. 1 illustrates a state in which a response 28 is transmitted from the control device 14 to the interfering device 12-5 via the repeater 16. Here, as illustrated, information of OK or NG is included together with ID=CBSD5.

When receiving an OK response to the resource applica-tion, the interfering device 12 starts communication using the frequency and transmission power for which the appli-cation is made. On the other hand, when receiving an NG response to the resource application, the resource applica-tion is performed again by changing the requested resource. According to the above processing, it is possible to continue to appropriately protect the communication of the interfered-with device 10 while permitting efficient communication to a large number of the interfering devices 12.

Configuration of First Embodiment

FIG. 2 illustrates a configuration of the interference control system of the first embodiment of the present dis-closure. In the interference control system illustrated in FIG. 2, an optical access service provided by a specific commu-nication carrier is incorporated in the configuration of the CBRS illustrated in FIG. 1. Note that, in FIG. 2, the same elements as those illustrated in FIG. 1 are denoted by the same reference numerals, and the description thereof will be omitted or simplified.

The system illustrated in FIG. 2 includes a plurality of interfering devices 30-1 to 30-3 together with interfering devices 12-1 and 12-2. The interfering devices 12-1 and 12-2 are disposed in a public network (NW) 36 together with the control device 14. In a case where it is not necessary to distinguish the interfering devices 12-1 and 12-2 from each other, they will be hereinafter referred to as "interfering devices 12".

The interfering devices 30-1 to 30-3 are wireless devices managed by subscribers of optical access services provided by communication carriers. In a case where it is not neces-sary to distinguish the interfering devices 30-1 to 30-3 from each other, they will be hereinafter referred to as "interfering devices 30" using reference numeral 30. The interfering device 30 is disposed in a network (hereinafter referred to as a "carrier NW 32") managed by a communication carrier. Note that the interfering device 30 is connected to the carrier NW 32 via a subscriber network managed by the subscriber, but here, they are not distinguished and are referred to as a "carrier NW 32".

A repeater 34 is further disposed in the carrier NW 32. The repeater 34 is an element constituting a main part of the interference control system of the present embodiment, and has a function of relaying a resource application and a response between the interfering device 30 and the control device 14.

Figure 3:
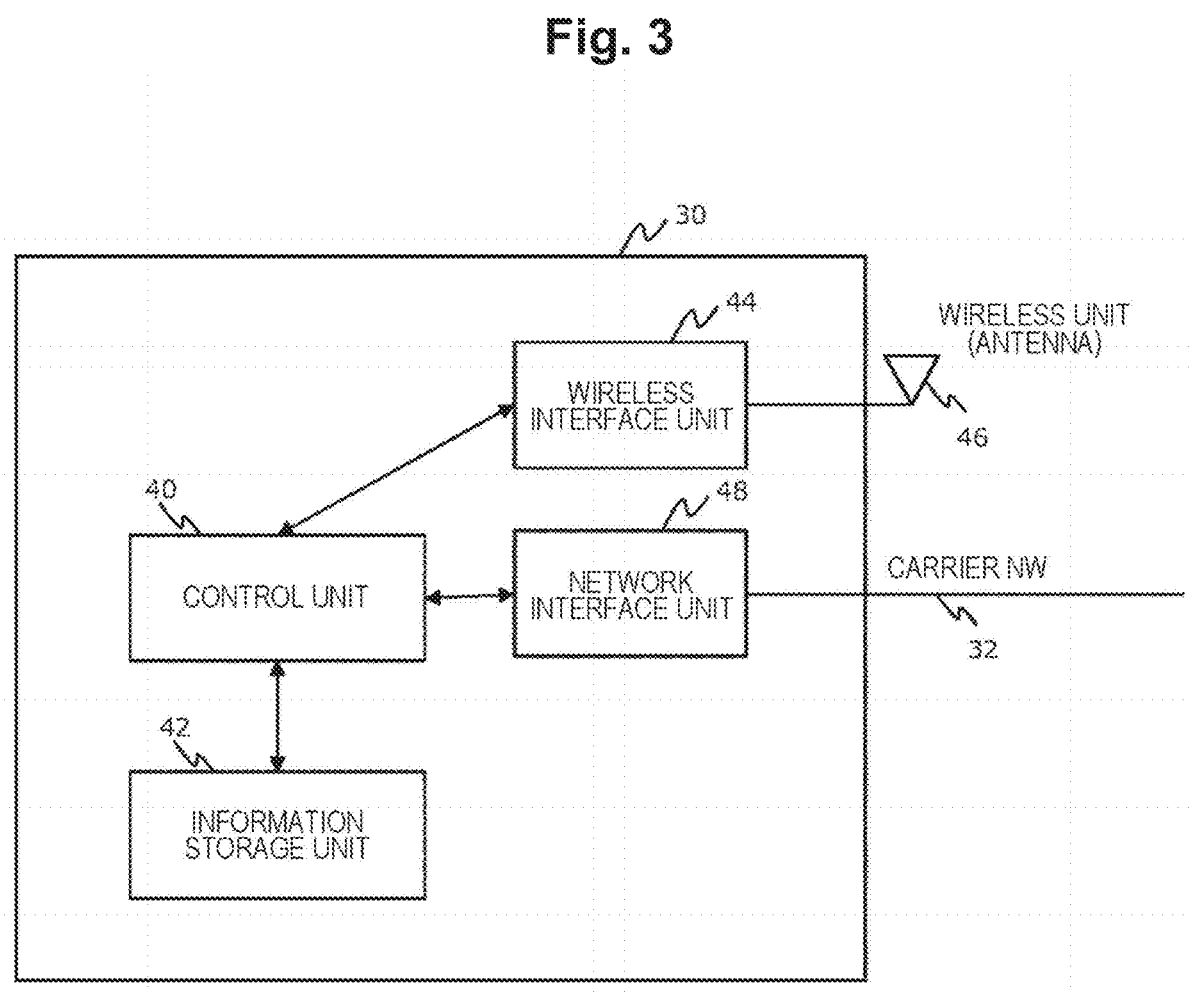
FIG. 3 is a diagram for describing a configuration of an interfering device disposed in a carrier NW in FIG. 2.

FIG. 3 is a block diagram for describing a configuration of the interfering device 30 illustrated in FIG. 2. As illustrated in FIG. 3, the interfering device 30 includes a control unit 40 and an information storage unit 42. The control unit 40 includes a processor unit (CPU). In addition, the information storage unit 42 includes a memory, and the memory stores a program to be executed by the CPU. The function of the control unit 40 is implemented by the CPU of the control unit 40 proceeding with the processing in accordance with the above-described program. The information storage unit 42 further stores resource information regarding an ID of the device, position information, a frequency used for communication, and the like.

The interfering device 30 includes a wireless interface unit 44. The wireless interface unit 44 can establish wireless communication with an external wireless device via an antenna 46. In addition, the wireless interface unit 44 can acquire GPS information of the device via the antenna 46. The interfering device 30 further includes a network interface unit 48. The network interface unit 48 can transmit and receive messages to and from the repeater 34 via the carrier NW 32.

Figure 4:
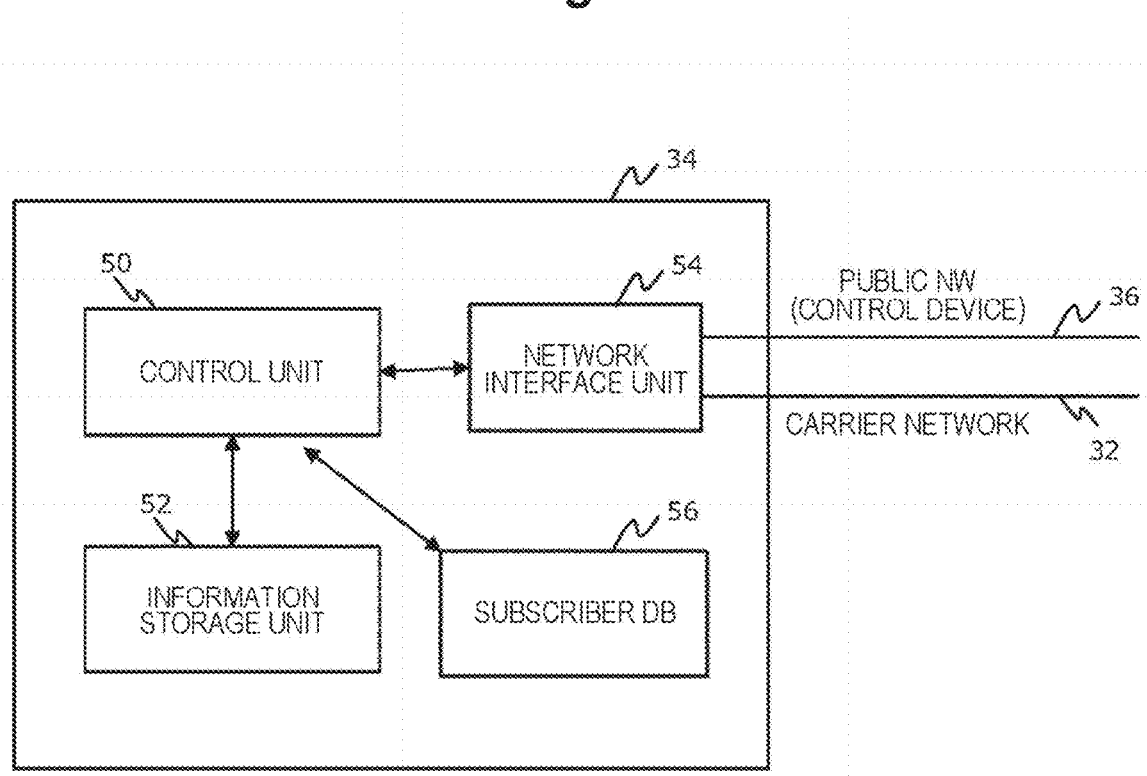
FIG. 4 is a diagram for describing a configuration of a repeater illustrated in FIG. 2.

FIG. 4 is a block diagram for describing a configuration of the repeater 34 illustrated in FIG. 2. As illustrated in FIG. 4, the repeater 34 includes a control unit 50 and an information storage unit 52. The control unit 50 includes a processor unit (CPU). In addition, the information storage unit 52 includes a memory, and the memory stores a program to be executed by the CPU. The function of the control unit 50 is implemented by the CPU of the control unit 50 proceeding with the processing in accordance with the above-described program. This program can be recorded in a recording medium and provided to the repeater 34, and can also be provided to the repeater 34 via a network. The information storage unit 52 further stores information such as a content of a message to be relayed and a "resource remaining amount table" indicating a frequency usage status. The resource remaining amount table will be described in detail later.

The repeater 34 includes a network interface unit 54. The network interface unit 54 can transmit and receive messages to and from each of the interfering devices 30 via the carrier NW 32, and can transmit and receive messages to and from the control device 14 via the public NW 36.

The repeater 34 further includes a subscriber database (DB) 56. The subscriber DB 56 stores information such as an ID and an address of a subscriber who manages each of the interfering devices 30.

Features of First Embodiment

Figure 5:
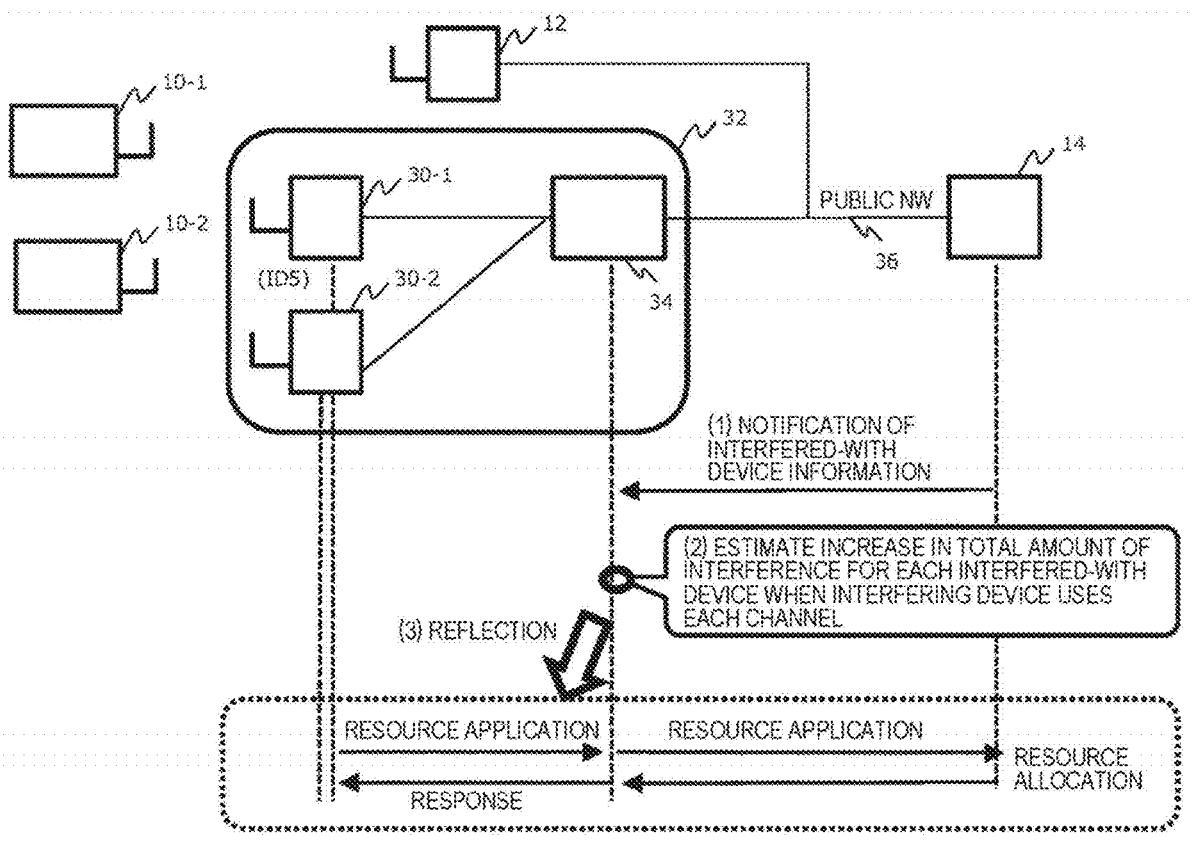
FIG. 5 is a diagram for describing features of the interference control system of the first embodiment of the present disclosure.

FIG. 5 is a diagram for describing features of the interference control system of the first embodiment of the present disclosure. Note that, in FIG. 5, the same elements as those illustrated in FIG. 2 are denoted by the same reference numerals, and the description thereof will be omitted or simplified.

The interference control system illustrated in FIG. 5 includes two interfered-with devices 10. In a case where there are a plurality of interfered-with devices and it is necessary to distinguish them, suffixes such as 10-1 and 10-2 will be hereinafter added. Interfered-with devices 10-1 and 10-2 may be the same system or different systems. In addition, the frequency channels used by the interfered-with devices 10-1 and 10-2 may be the same, may overlap, or may be different.

FIG. 5 specifically illustrates that the processing described below is executed in time series in the interference control system of the present embodiment.

(1): Interfered-with device information is provided from the control device 14 to the repeater 34.

(2): The repeater 34 estimates an increase amount in the total amount of interference I on the basis of the acquired information.

(3): The repeater 34 further reflects an estimation result regarding the increase amount in the total amount of interference I in resource applications and responses exchanged between the interfering device 30 and the control device 14.

In the process (1) above, the following information is provided from the control device 14 to the repeater 34 as the interfered-with device information.

1. Position (Latitude and Longitude)
2. Antenna Pattern (Including Antenna Gain)
3. Frequency Channel Used
4. Allowable Amount of Interference In addition to the above-described interfered-with device information, the repeater 34 acquires the following information from the subordinate interfering device 12. Note that this information may be acquired directly from the interfering device 12 or may be acquired via the control device 14.

1. Position (Latitude, Longitude, Indoor and Outdoor)
2. Frequency Channel Used
3. Prescribed Transmission Power
4. Antenna Gain In the process (2) above, an increase amount in the total amount of interference I caused in each of the interfered-with devices 10 in a case where each of the interfering devices 30 generates a prescribed transmission power in each of the available frequency channels is estimated.

In the process (3) above, the "resource remaining amount table" is updated on the basis of the estimated increase amount in the total amount of interference I. Further, processing for reflecting the content of the updated resource remaining amount table in the resource application or the response is performed.

Figure 6:
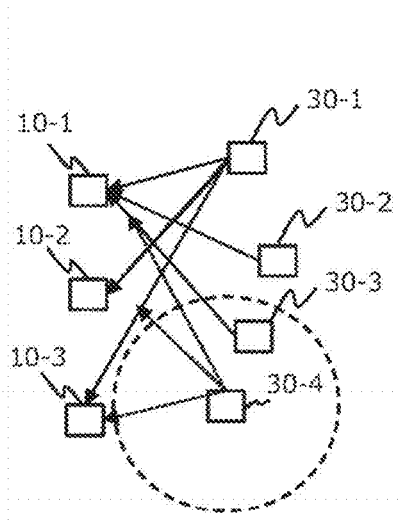
FIG. 6 is a diagram illustrating an example of disposition of interfered-with devices and interfering devices assumed in the first embodiment of the present disclosure.

FIG. 6 illustrates an example of disposition of the interfered-with devices 10 and the interfering devices 30 assumed in the present embodiment. FIG. 6 includes three interfered-with devices 10-1 to 10-3 and four interfering devices 30-1 to 30-4. It is assumed that the fourth interfering device 30-4 is newly installed at the illustrated position in a situation where three interfering devices 30-1 to 30-3 already exist. Hereinafter, a procedure for estimating the resource remaining amount table will be described using this disposition as an example.

Figure 7:
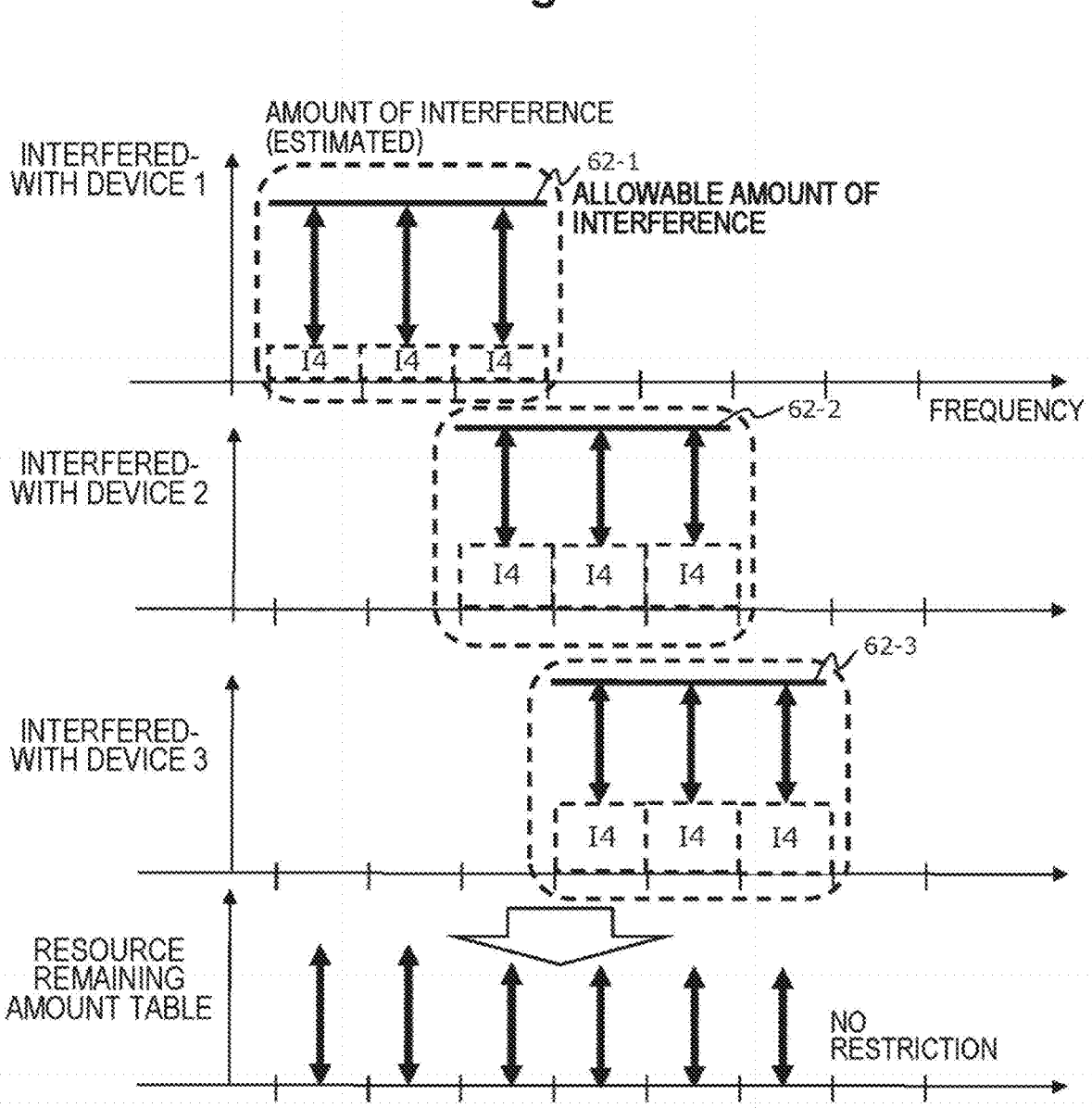
FIG. 7 is a diagram illustrating an example of an estimation result of an amount of interference to which an interfered-with device is subjected by one interfering device in the first embodiment of the present disclosure.

The upper three parts of FIG. 7 illustrate estimation results of increase amounts in the total amount of interference I caused in the respective interfered-with devices 10-1 to 10-3 due to the newly installed interfering device 30-4.

Horizontal lines 62-1 to 62-3 of the "allowable amount of interference" illustrated in the respective parts have heights indicating allowable values of interference, and widths indicating frequency bands used in the respective interfered-with devices 10-1 to 10-3. For example, the horizontal line 62-1 illustrated in the uppermost part indicates that the interfered-with device 10-1 uses three frequency channels (hereinafter referred to as "F1 to F3") on the left side in the figure.

The repeater 34 specifies a used frequency channel of the interfered-with device 10-1 on the basis of the interfered-with device information acquired from the control device 14. In addition, the repeater 34 estimates the amount of interference "I4" received by the interfered-with device 10-1 in a case where the interfering device 30-4 uses a predetermined transmission power in the used frequency channels on the basis of the antenna characteristics, positions, and the like of the interfered-with device 10-1 and the interfering device 30-4. The repeater 34 also estimates "I4" for the interfered-with devices 10-2 and 10-3 in a similar procedure.

Each block of "I4" illustrated in the upper three parts of FIG. 7 indicates the increase amount in the amount of interference estimated in this manner. Arrows drawn between each block of "I4" and horizontal lines 62-1 to 62-3 of "allowable amount of interference" mean margins of the amount of interference remaining in each of the interfered-with devices 10-1 to 10-3 in a case where the interfering device 30-4 uses a prescribed transmission power in each frequency channel. Hereinafter, this margin is referred to as a "resource remaining amount".

The repeater 34 can estimate the resource remaining amount for each used frequency channel for each of the interfered-with devices 10-1 to 10-3 by subtracting the estimated amount of interference "I4" from the known allowable amount of interference. The lowermost part of FIG. 7 illustrates an example of the "resource remaining amount table" generated on the basis of the estimation.

For example, the two leftmost frequency channels (F1 and F2) in the figure are used only by the interfered-with device 10-1. Therefore, these frequency channels may be used only in consideration of protection of the interfered-with device 10-1. Therefore, the estimated value of the resource remaining amount in the interfered-with device 10-1 can be regarded as the resource remaining amount of the entire system as it is.

On the other hand, the third frequency channel (F3) from the left in FIG. 7 is used by two interfered-with devices 10-1 and 10-2. In this case, it is necessary to make the total amount of interference I equal to or less than the allowable value in both of them. Therefore, in the frequency channel F3, it is necessary to set a smaller one of the resource remaining amount estimated by the interfered-with device 10-1 and the resource remaining amount estimated by the interfered-with device 10-2 as the resource remaining amount of the entire system. That is, for the frequency channels used by the plurality of interfered-with devices 10, it is necessary to set the minimum resource remaining amount among the resource remaining amounts estimated by the respective interfered-with devices 10 as the resource remaining amount of the entire system.

In the example illustrated in FIG. 7, the frequency channel (hereinafter referred to as "F7") illustrated on the rightmost side is not used in any interfered-with device 10. In this case, the interfering device 30 can use the frequency channel F7 without any restrictions for the purpose of protecting the interfered-with device 10. Therefore, the frequency channel F7 can be treated as an "unrestricted" channel.

From the above viewpoint, the resource remaining amount table in the lowermost part of FIG. 7 is generated when the interfering device 30-4 is newly installed. With reference to such a resource remaining amount table, it is possible to generate a resource remaining amount table under the most severe conditions, that is, assuming that all frequency channels are used with a prescribed transmission power in a case where the interfering device 30-4 is newly installed. With reference to such a resource remaining amount table, it is possible to ascertain which frequency channel is highly likely to be congested and which channel is less likely to be congested under the most severe conditions. Therefore, if a channel that is less likely to be congested is preferentially used in subsequent communication, it is possible to obtain good communication quality while appropriately reducing the amount of interference and avoiding rejection of useless resource application.

By the way, in the above example, the increase amount in the total amount of interference I caused by the interfering device 30-4 is estimated on the assumption that the interfering device 30-4 is newly started to be used or updated, but the estimation target is not limited thereto. Similar estimation may be performed for a case where each of the existing interfering devices 30-1 to 30-3 uses each frequency channel.

Figure 8:
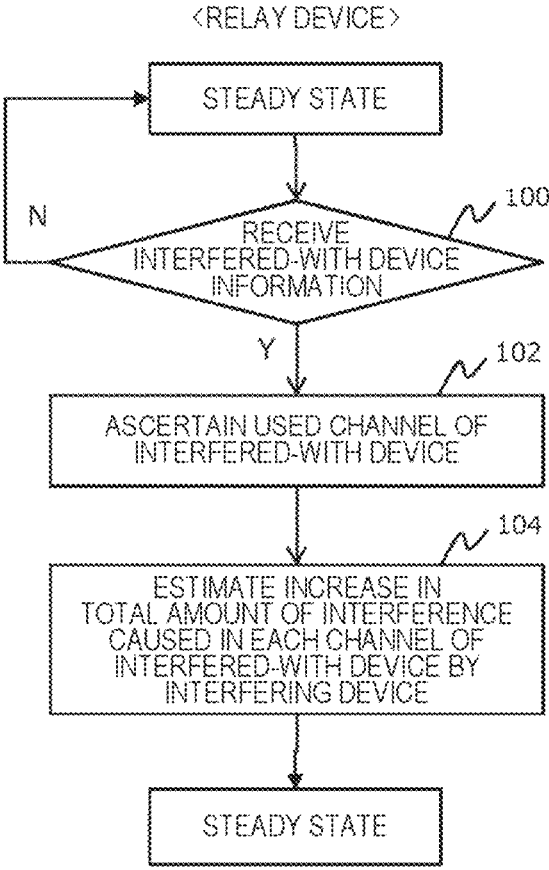
FIG. 8 is a flowchart for describing a flow of processing executed by the repeater to estimate the amount of interference to which the interfered-with device is subjected by the interfering device in the first embodiment of the present disclosure.

FIG. 8 is a flowchart for describing a flow of processing executed by the repeater 34 to generate the resource remaining amount table. As illustrated in FIG. 8, the repeater 34 in the steady state first determines whether or not the aforementioned interfered-with device information has been received from the control device 14 (step 100).

The above processing is repeated until reception of the interfered-with device information is determined. Then, when the reception of the information is recognized, the used frequency channel of the interfered-with device 10 is ascertained (step 102). For example, according to the example illustrated in FIG. 7, the used frequency channel of each of the interfered-with devices 10-1 to 10-3 is ascertained by the processing of this step.

After the above processing is completed, next, the increase amount in the total amount of interference I caused in each of the used frequency channels is estimated for each of the interfered-with devices 10 (step 104). For example, according to the examples illustrated in FIGS. 6 and 7, when the interfering device 30-4 is newly started to be used or updated, the increase amount in the total amount of interference I caused in each used frequency channel of each interfered-with device 10 is estimated. In this step, a resource remaining amount table as illustrated in the lower part of FIG. 7 is further generated on the basis of the estimation result.

After the above processing is completed, the repeater 34 ends this routine and temporarily returns to the steady state.

As described with reference to FIG. 5, the repeater 34 reflects the contents of the resource remaining amount table in the resource application transmitted to the control device 14 and the response returned to the interfering device 12. Specifically, the content of the resource remaining amount table is reflected in the resource application or response such that a frequency channel having a large resource remaining amount is used in preference to a channel having a small resource remaining amount. As a result, for example, in the example illustrated in FIG. 7, a frequency channel that is "unrestricted" is used for new communication with first priority.

Therefore, according to the wireless communication system of the present embodiment, each of the interfered-with devices 10 can be effectively protected in an environment where the plurality of interfered-with devices 10 and the plurality of interfering devices 30 exist. In addition, it is possible to avoid repetition of useless resource application and rejection between the plurality of interfering devices 30 and the control device 14. Furthermore, good communication quality can be achieved in each of the interfering devices 30.

Second Embodiment

Next, a second embodiment of the present disclosure will be described with reference to FIGS. 9 to 12 together with FIGS. 2 to 4 and 8. The interference control system of the present embodiment can be implemented by the hardware configuration illustrated in FIGS. 2 to 4 as in the case of the first embodiment.

Features of Second Embodiment

Figure 9:
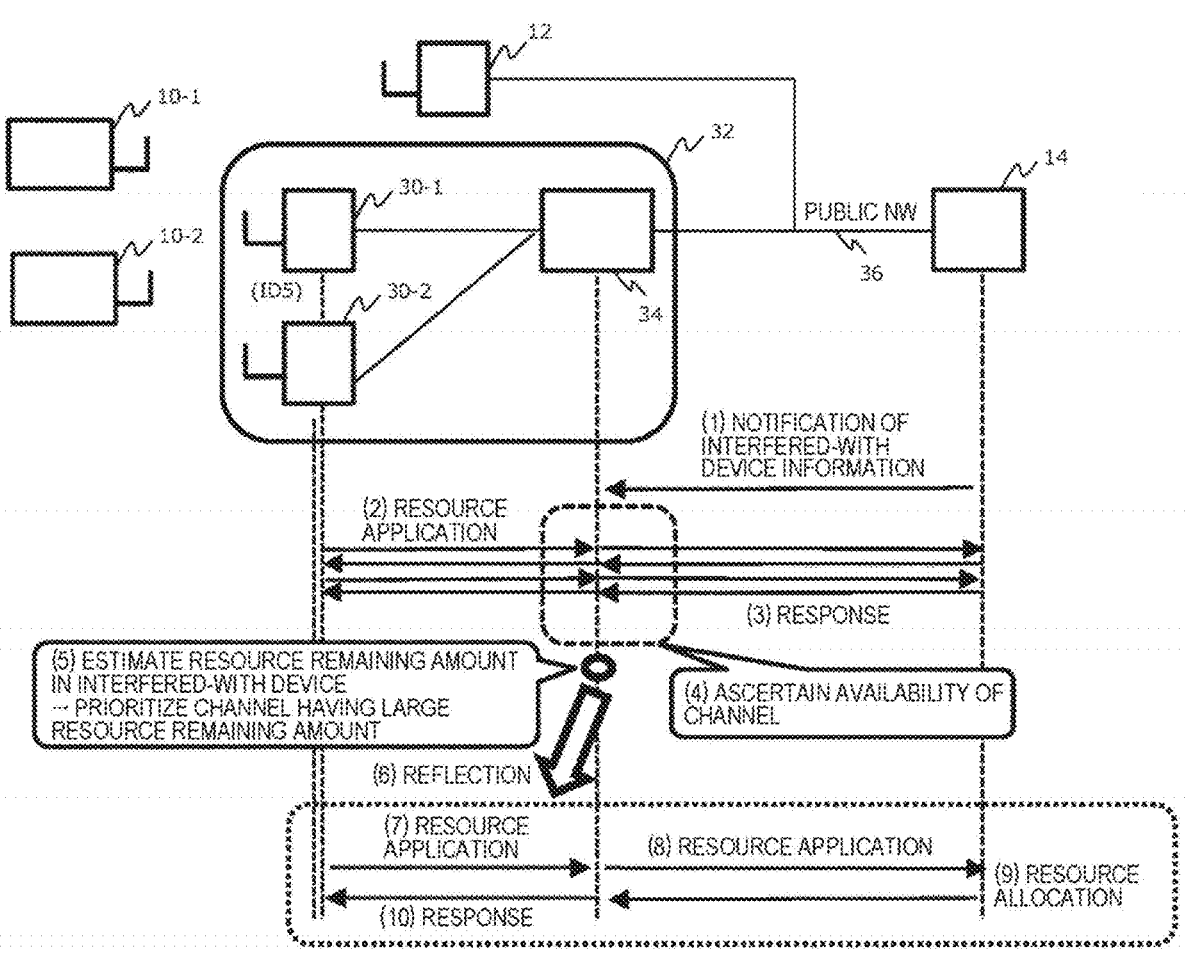
FIG. 9 is a diagram for describing features of an interference control system of a second embodiment of the present disclosure.

FIG. 9 is a diagram for describing features of the second embodiment of the present disclosure. Note that, in FIG. 9, the same elements as those illustrated in FIG. 5 are denoted by the same reference numerals, and the description thereof will be omitted or simplified.

FIG. 9 illustrates that the processing described below is executed in time series in the interference control system of the present embodiment.

(1): Interfered-with device information is provided from the control device 14 to the repeater 34.

(2): A resource application is issued from the interfering device 30 to the control device 14.

(3): A response to the interfering device 30 is returned from the control device 14.

(4): The repeater 34 accumulates resource applications and responses, and ascertains the availability of frequency channels on the basis of their contents.

(5): The repeater 34 estimates a resource remaining amount on the basis of the ascertained availability of the frequency channels, and generates a resource remaining amount table.

(6) to (10): The repeater 34 reflects the results of the resource remaining amount table in the resource application to the control device 14 or the response to the interfering device 30 such that priority is given to use of the frequency channel having a large resource remaining amount.

Figure 10:
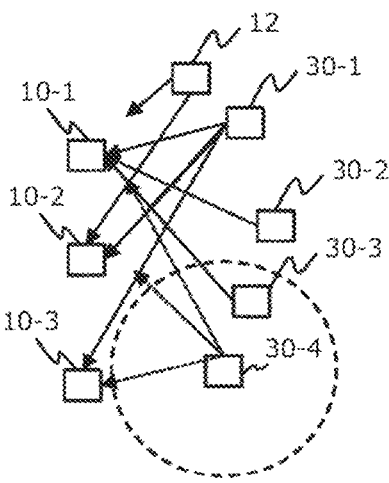
FIG. 10 is a diagram illustrating an example of disposition of interfered-with devices and interfering devices assumed in the second embodiment of the present disclosure.

FIG. 10 illustrates an example of disposition of the interfered-with devices 10 and the interfering devices 12 and 30 that can be used in the present embodiment. The example illustrated in FIG. 10 is the same as the above example illustrated in FIG. 6 except that the interfering device 12 belonging to the public NW 36, that is, the interfering device 12 not belonging to the repeater 34 is included. Hereinafter, a procedure in which the repeater 34 estimates the resource remaining amount table in the present embodiment will be described using this disposition as an example.

Figure 11:
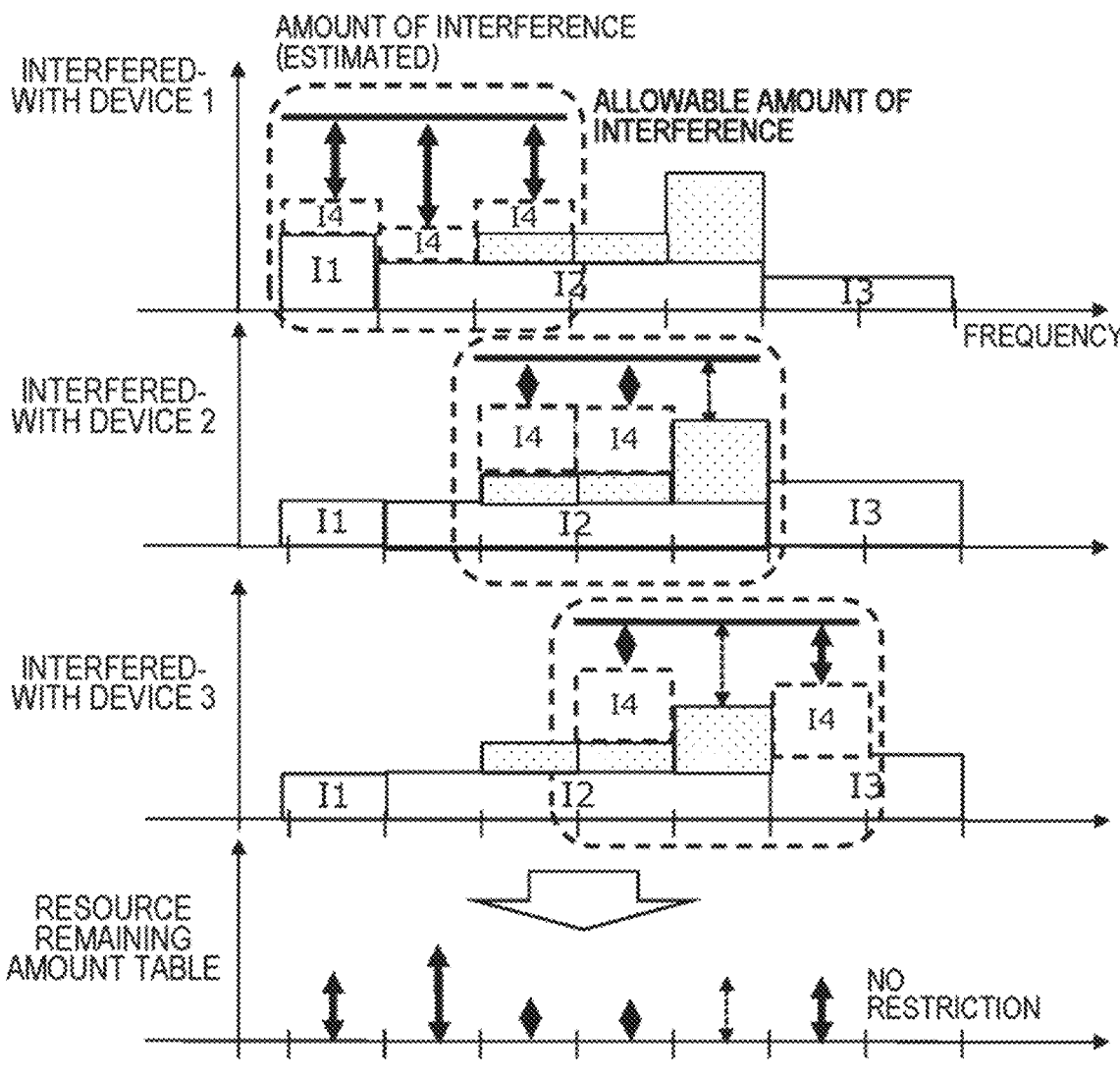
FIG. 11 is a diagram illustrating an example of a resource remaining amount table estimated in the second embodiment of the present disclosure.

FIG. 11 is a diagram for describing a process in which the repeater 34 ascertains the availability of the frequency channels and generates the resource remaining amount table on the basis of the ascertained situation. In FIG. 11, the block "I1" indicates the amount of interference received by each of the interfered-with devices 10 in a case where the interfering device 30-1 uses the prescribed transmission power in the corresponding frequency channel. Each block of "I2" and "I3" is the amount of interference caused by the interfering devices 30-2 and 30-3.

For example, the repeater 34 can estimates that the interfering device 30-1 is using the channel F1 when receiving a resource application requesting use of the frequency channel F1 from the interfering device 30-1 and returning a response permitting the application. Then, the magnitude of the amount of interference I1 that the interfering device 30-1 gives to each of the interfered-with devices 10 can be estimated by the method described in the first embodiment.

As for the interfering devices 30-2 and 30-3, the repeater 34 can similarly estimate how much amounts of interference I2 and I3 are given to each of the interfered-with devices 10 on which frequency channel. Each block of "I1", "I2", and "I3" illustrated in FIG. 11 indicates a result of estimation by the above method on the basis of accumulation of resource applications and responses.

In FIG. 11, three blocks indicated by dots above the block "I2" indicate the amount of interference caused by the interfering device 12 belonging to the public NW 36. Since the interfering device 12 is not under the control of the repeater 34, the repeater 34 cannot estimate the amount of interference by the same method as "I1" to "I3". Therefore, the repeater 34 estimates the amount of interference caused by the interfering device 12 on the basis of the history of responses from the control device 14 to the subordinate interfering device 30.

For example, in a case where the resource application is permitted even though the total amount of interference close to the allowable amount of interference is generated by the resource application issued from the subordinate interfering device 30, it is estimated that the amount of interference caused by the interfering device 12 is not generated in the frequency channel related to the application. In addition, in a case where the resource application issued from the subordinate interfering device 30 has a sufficient margin for the allowable amount of interference but a response not permitting the application is received, it is estimated that the amount of interference larger than the margin is caused by the interfering device 12. Three blocks indicated by dots in FIG. 11 indicate results of estimation by such a method on the basis of the response history from the control device 14.

The block "I4" illustrated in FIG. 11 indicates the amount of interference caused by the newly installed interfering device 30-4, as in the case of the first embodiment. The method for estimating the amount of interference "I4" is also similar to that in the first embodiment. However, in FIG. 11, broken line arrows are illustrated instead of the "I4" block in the channel (hereinafter referred to as "F5") located on the rightmost side of the used frequency channel of the interfered-with device 10-2 and the channel F5 located in the center of the used frequency channel of the interfered-with device 10-3.

The hiding of the "I4" block in the used frequency channel of each of the interfered-with devices 10 indicates that, in these used frequency channels, when the interfering device 30-4 uses the prescribed transmission power, the total amount of interference I exceeds the allowable amount of interference in relation to the existing amount of interference. Further, broken line arrows shown in these frequency channels are margins of the amount of interference in the channel. The repeater 34 can calculate the transmission power that can be additionally allocated to the interfering device 30 on the basis of the margins.

The lowermost part of FIG. 11 illustrates a resource remaining amount table generated on the basis of the availability of the frequency channel ascertained by the above method. As in the case of the first embodiment (see FIG. 7), the resource remaining amount in each frequency channel is the smallest among the resource remaining amounts ascertained by all the subordinate interfered-with devices 10. For example, for the above-described "I4" block hidden channel, since the margin estimated by the interfered-with device 10-2 is smaller than the margin estimated by the interfered-with device 10-3, the latter broken line arrow is indicated in the resource remaining amount table. In the resource remaining amount table illustrated in FIG. 11, as in the case of the first embodiment, "unrestricted" is displayed for the frequency channel that is not used by any of the interfered-with devices 10.

According to the above method, in a case where the interfering device 30-4 is newly started to be used or updated, the resource remaining amount caused under the most severe condition can be reflected in the resource remaining amount table. For this reason, in a case where there is a request for a new resource from any of the interfering device 30 thereafter, if the allocation of resources is determined according to the resource remaining amount table, the communication of the interfered-with device 10 can be reliably protected.

Figure 12:
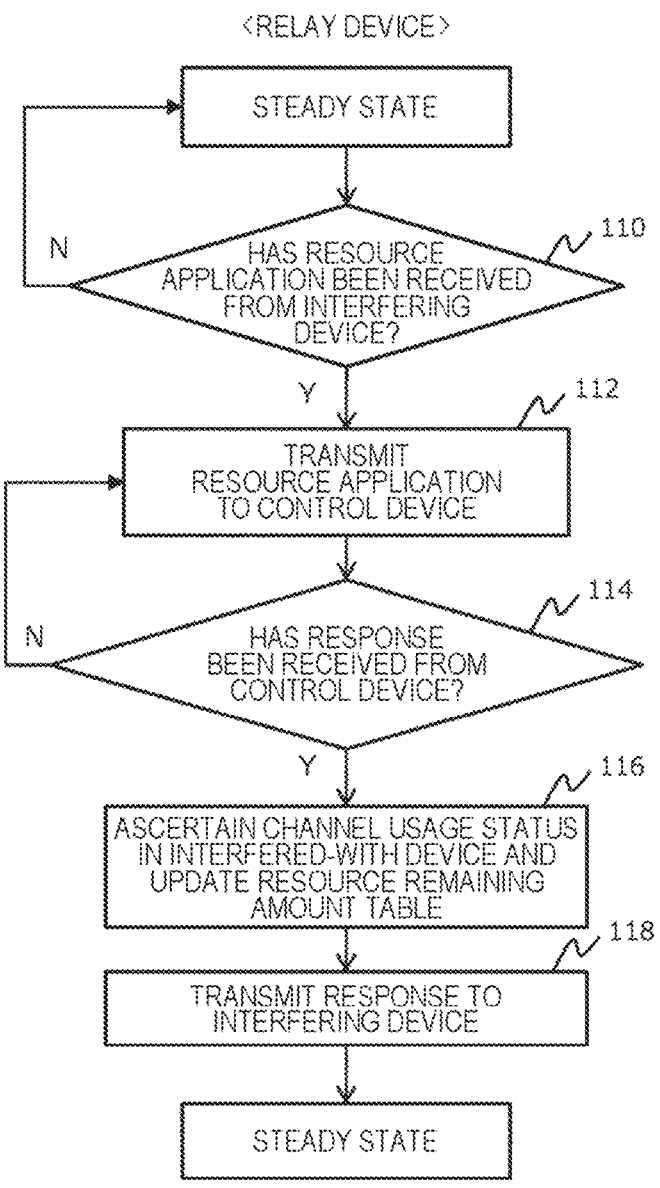
FIG. 12 is a flowchart for describing a flow of processing executed by a repeater in the second embodiment of the present disclosure.

FIG. 12 is a flowchart for describing a flow of processing executed by the repeater 34 for relaying the resource application from the interfering device 30 and the response from the control device 14 between them. Note that the repeater 34 executes the routine illustrated in FIG. 12 and appropriately executes the routine illustrated in FIG. 8 in order to estimate the increase amount in the total amount of interference I as in the first embodiment. As illustrated in FIG. 12, the repeater 34 in the steady state determines whether or not a resource application has been received from any of the subordinate interfering devices 30 (step 110).

When the reception of the resource application is determined, the resource application is transmitted to the control device 14 (step 112). The resource application transmitted to the control device 14 by this processing desirably requires use of the frequency channel indicating the largest resource remaining amount in the resource remaining amount table.

Next, it is determined whether or not a response to the resource application has been received from the control device 14 within a certain period of time (step 114). The response includes contents for permitting or rejecting the resource application. Alternatively, the response may include information about resources that can be permitted to be used, such as the amount of transmission power that can be permitted and the frequency channel that can be permitted.

In a case where the response from the control device 14 cannot be received, the process returns to step 112 to retransmit the resource application. On the other hand, in a case where the reception of the response is recognized, next, a process of ascertaining the channel usage status in the interfered-with device 10 and a process of updating the resource remaining amount table on the basis of the ascertained status are executed (step 116).

Specifically, in step 116 above, first, the contents of the current resource application and response are accumulated. Next, the total amount of interference I caused by the existing wireless communication is estimated on the basis of the accumulated data of the resource application and the response. For example, in a case where wireless communication is performed between the subordinate interfering devices 30-1 to 30-3 and the external interfering device 12, the total amount of interference I caused by them is estimated. As a result, in the example of FIG. 11, blocks indicated as "I1" to "I3" and blocks indicated by dots are estimated.

In step 116 above, reference is now made to the results of the routine shown in FIG. 8. Specifically, an increase amount in the total amount of interference I referred to in each of the interfered-with devices 10 in a case where the newly installed interfering device 30 uses each frequency channel is referred to. Then, the increase amount is superimposed on the total amount of interference I estimated by the above processing. In an example in which the interfering device 30-4 is newly started to be used or updated, as a result, the usage status of the frequency channels illustrated in the upper three parts of FIG. 11 is ascertained.

In step 116 above, finally, the resource remaining amount table is updated on the basis of the usage status of the frequency channel ascertained as described above. In an example in which the interfering device 30-4 is newly started to be used or updated, the resource remaining amount table illustrated in the lowermost part of FIG. 11 is thereby generated.

After the above processing is completed, the repeater 34 then returns a response to the resource application to the interfering device 30 that has issued the resource application (step 118). In this response, the use of the frequency channel in which the largest resource remaining amount is indicated in the resource remaining amount table updated in step 116 above is set as the first priority, and the use of the channel falling within the resource remaining amount is permitted.

The resource remaining amount table obtained in step 116 is generated assuming a condition that the newly installed interfering device 30 uses a prescribed transmission power in all frequency channels. That is, the resource remaining amount table is generated assuming the most severe condition at present. Then, the response returned to the interfering device 30 follows the resource remaining amount table as described above. Therefore, according to the wireless communication system of the present embodiment, it is possible to continue to appropriately protect all the interfered-with devices 10.

According to the above processing, the permission corresponding to the largest resource indicated by the resource remaining amount table is given to the interfering device 30 that has issued the resource application. Therefore, according to the wireless communication system of the present embodiment, the maximum communication efficiency can be achieved as long as the protection of the interfered-with device 10 can be appropriately maintained.

Third Embodiment

Next, a third embodiment of the present disclosure will be described with reference to FIGS. 13 to 17 together with FIGS. 2 to 4, 8, and 12. The interference control system of the present embodiment can be implemented by the hardware configuration illustrated in FIGS. 2 to 4 as in the case of the first embodiment. Furthermore, in the present embodiment, the repeater 34 executes the routine illustrated in FIG. 8 and the routine illustrated in FIG. 12 described above, as in the case of the second embodiment. Accordingly, in the present embodiment as well, the repeater 34 generates a resource remaining amount table similar to that of the second embodiment.

Features of Third Embodiment

Figure 13:
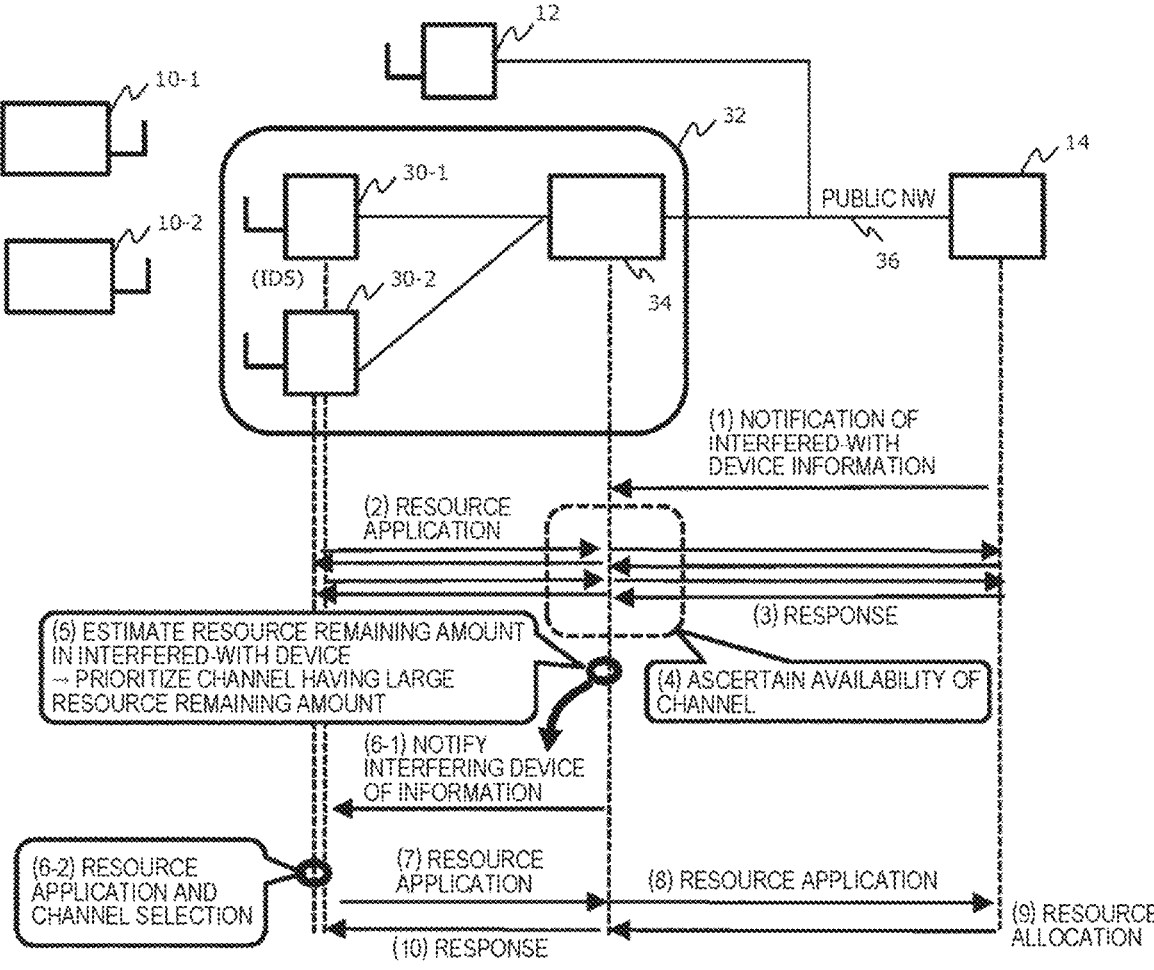
FIG. 13 is a diagram for describing features of an interference control system of a third embodiment of the present disclosure.

FIG. 13 is a diagram for specifically describing a flow of processing executed in the present embodiment in order to reflect the content of the resource remaining amount table in the resource application or response. Note that, in FIG. 13, elements or processes corresponding to those illustrated in FIG. 9 are denoted by the same reference numerals, and the description thereof will be omitted or simplified.

FIG. 13 specifically illustrates that the processing described below is executed in time series in the interference control system of the present embodiment.

(1) to (5): A resource remaining amount table is generated in a procedure similar to that in the second embodiment.

(6-1): The repeater 34 notifies the subordinate interfering device 30 of information of the resource remaining amount table.

(6-2): The interfering device 30 selects a frequency channel having a low likelihood of congestion on the basis of the received information of the resource remaining amount table, and generates a resource application.

(7) to (10): The interfering device 30 starts communication in accordance with the response returned by the control device 14 in response to the resource application transmitted by the interfering device 30.

Figure 14:
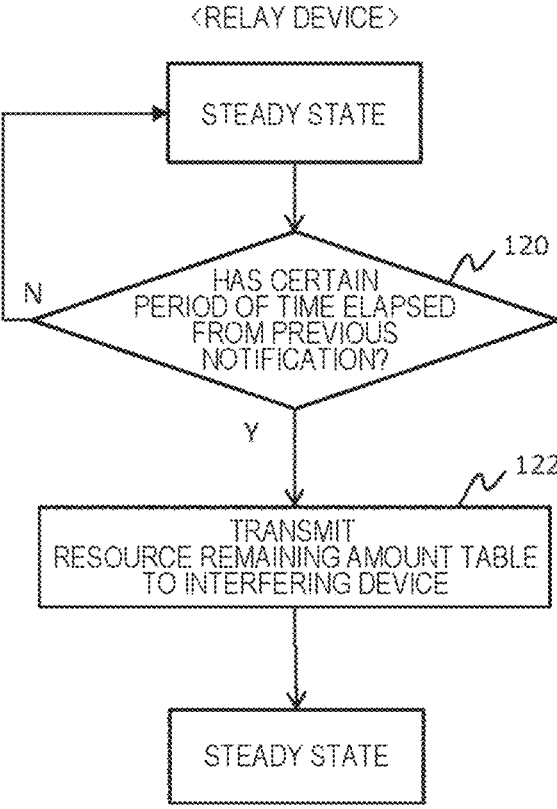
FIG. 14 is a flowchart for describing a flow of processing executed by a repeater in the third embodiment of the present disclosure.

FIG. 14 is a flowchart of a routine executed by the repeater 34 to implement the process (6-1) above. Every time a certain period of time has elapsed, the repeater 34 of the present embodiment provides the subordinate interfering device 30 with the latest resource remaining amount table at that time.

In order to implement this function, the repeater 34 determines whether or not a certain period of time has elapsed from the previous notification in the steady state (step 120).

As a result, when the elapse of the certain period of time is recognized, the latest resource remaining amount table is transmitted to all the subordinate interfering devices 30 (step 122). After the above processing is completed, the repeater 34 ends the current routine and returns to the steady state again.

Figure 15:
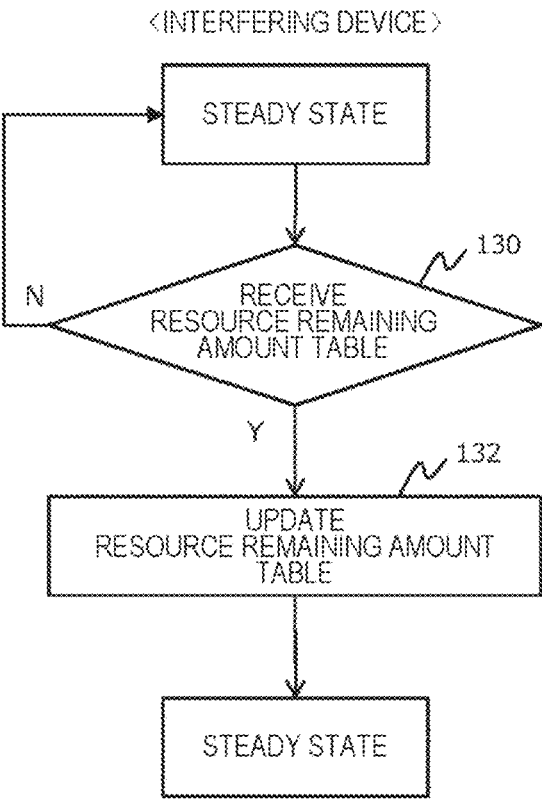
FIG. 15 is a flowchart for describing a flow of processing executed by an interfering device to update a resource remaining amount table in the third embodiment of the present disclosure.

FIG. 15 is a flowchart of a routine executed by each of the interfering devices 30 to implement a part of (6-2) above. As illustrated in FIG. 15, the interfering device 30 according to the present embodiment determines whether or not a notification of a resource remaining amount table has been received from the repeater 34 in a steady state (step 130).

As a result, when the reception of the resource remaining amount table is recognized, the resource remaining amount table stored therein is updated in accordance with the content (step 132). After the above processing is completed, the interfering device 30 ends the current routine and returns to the steady state again.

Figure 16:
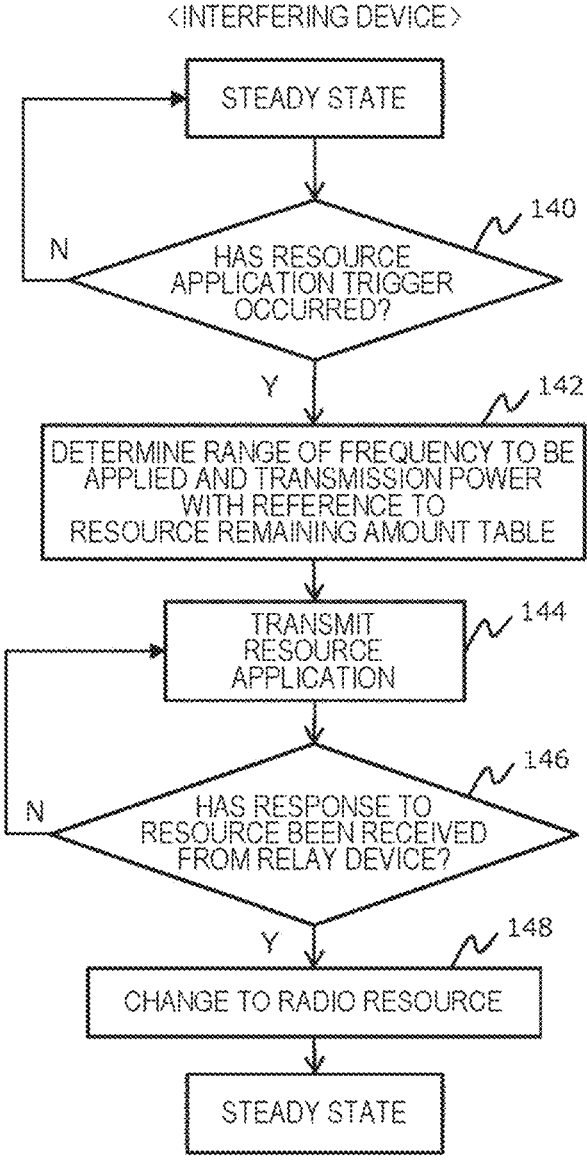
FIG. 16 is a flowchart for describing a flow of processing executed by the interfering device to transmit a resource application based on the resource remaining amount table in the third embodiment of the present disclosure.

FIG. 16 is a flowchart of a routine executed by the rest of (6-2) above and each of the interfering devices 30 to implement the processes (7) and (10) above. As illustrated in FIG. 16, the interfering device 30 in the steady state determines whether or not a resource application trigger has occurred (step 140). For example, upon recognizing the necessity of new communication, the interfering device 30 determines that a trigger for resource application has occurred.

When the trigger for the resource application is recognized, the range of the frequency to be used and the transmission power are determined with reference to the resource remaining amount table updated by the processing of FIG. 15 (step 142).

FIG. 17 illustrates an example of the resource remaining amount table referred to in step 142 above. In FIG. 17, the resource remaining amount and the update time are described for each frequency channel. In step 142 above, the frequency channel indicating the largest resource remaining amount in the resource remaining amount table is preferentially set as the application channel. Specifically, if there is an "unrestricted" channel, the channel is set as the application channel. If there is no "unrestricted" channel, the channel having the largest numerical value of the resource remaining amount is set as the application channel. In addition, since credibility of data whose update time is old is lowered, the time is also considered when an application channel is determined. For example, in a case where there are a plurality of channels having the same resource remaining amount, the channel having the latest update time is set as the application channel.

Further, in step 142 above, the transmission power to be used is determined so as not to exceed the resource remaining amount indicated in the resource remaining amount table. For example, when the frequency channel 1 illustrated in FIG. 17 is determined as the application channel, the transmission power is determined to be equal to or less than a [dbm].

After the above processing is completed, the interfering device 30 transmits a resource application with the determined content (step 144). Thereafter, this application reaches the control device 14 via the repeater 34. In the present embodiment, the resource application is set to satisfy the limit of the resource remaining amount table. Therefore, in principle, the control device 14 determines permission for the application.

The response returned by the control device 14 to the resource application is returned to the interfering device 30 that has issued the resource application via the repeater 34. After issuing the resource application, the interfering device 30 repeatedly determines whether or not the response has been transmitted from the repeater 34 (step 146).

As a result, when the reception of the response is recognized, a change is made to the own wireless resource according to the content of the received response (step 148). Thereafter, the interfering device 30 returns to the steady state, and this routine ends.

According to the above processing, it is possible to cause the interfering device 30 to start new communication within a range in which each of the interfered-with devices 10 can be appropriately protected. In addition, it is possible to effectively avoid useless applications and rejections from being exchanged between the interfering device 30 and the control device 14. Further, since the channel having the largest resource remaining amount is preferentially used, resources of the entire system can be effectively utilized to the maximum. Therefore, according to the present embodiment, it is possible to efficiently improve the communication quality of the interfering device 30 while protecting the interfered-with device 10.

Fourth Embodiment

Next, a fourth embodiment of the present disclosure will be described with reference to FIGS. 18 and 19 together with FIGS. 2 to 4, 8, and 12. The interference control system of the present embodiment can be implemented by the hardware configuration illustrated in FIGS. 2 to 4 as in the case of the first embodiment. Furthermore, in the present embodiment, the repeater 34 executes the routine illustrated in FIG. 8 and the routine illustrated in FIG. 12 described above, as in the case of the second embodiment. Accordingly, in the present embodiment as well, the repeater 34 generates a resource remaining amount table similar to that of the second embodiment.

Features of Fourth Embodiment

Figure 18:
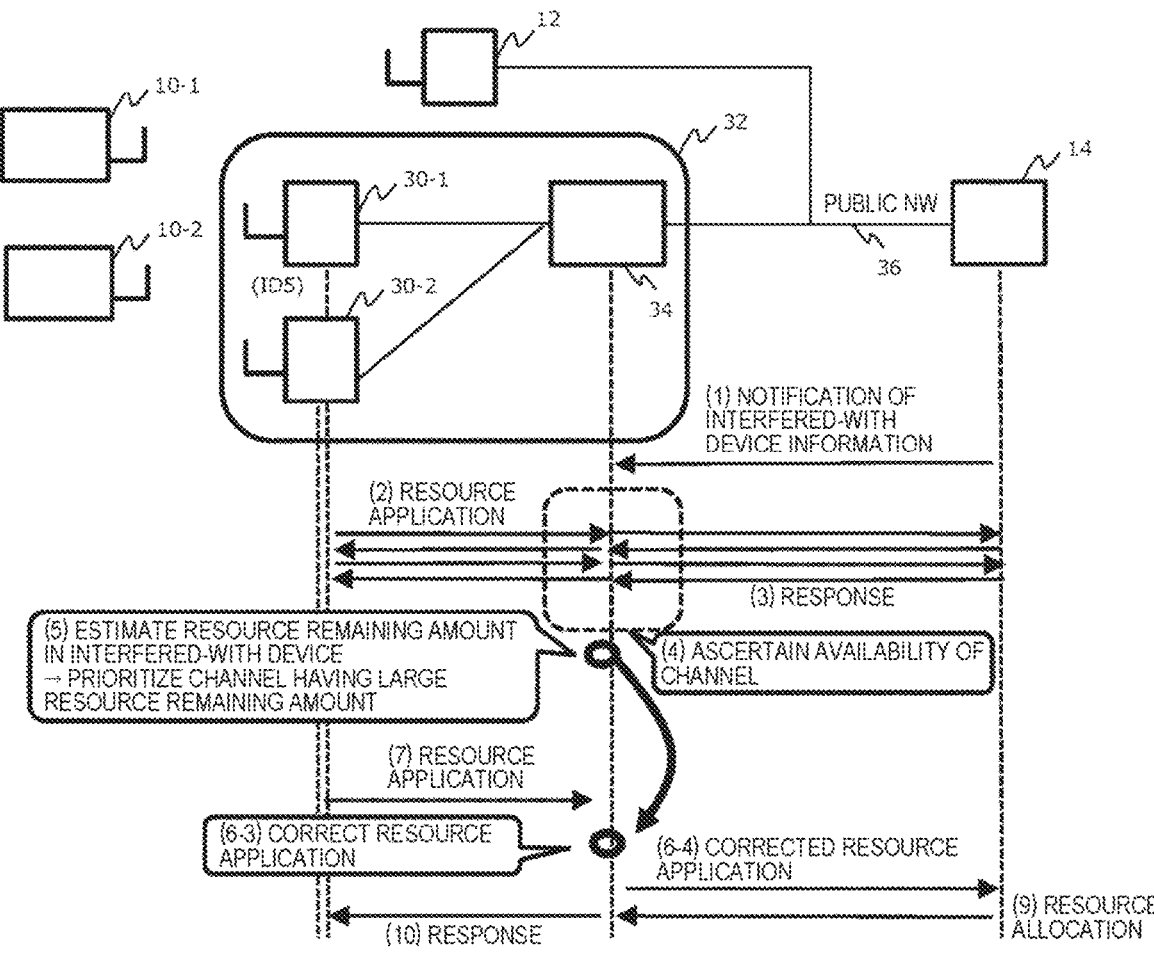
FIG. 18 is a diagram for describing features of an interference control system of a fourth embodiment of the present disclosure.

FIG. 18 is a diagram for specifically describing a flow of processing executed in the present embodiment in order to reflect the content of the resource remaining amount table in the resource application or response. Note that, in FIG. 18, elements or processes corresponding to those illustrated in FIG. 9 are denoted by the same reference numerals, and the description thereof will be omitted or simplified.

FIG. 18 specifically illustrates that the processing described below is executed in time series in the interference control system of the present embodiment.

(1) to (5): A resource remaining amount table is generated in a procedure similar to that in the second embodiment.

(7): The interfering device 30 transmits a resource application to the repeater 34.

(6-3): The repeater 34 corrects the received resource application according to the restriction of the resource remaining amount table.

(6-4): The repeater 34 transmits the corrected resource application to the control device 14.

(9) to (10): The interfering device 30 starts communication in accordance with the response returned by the control device 14 to the resource application.

Figure 19:
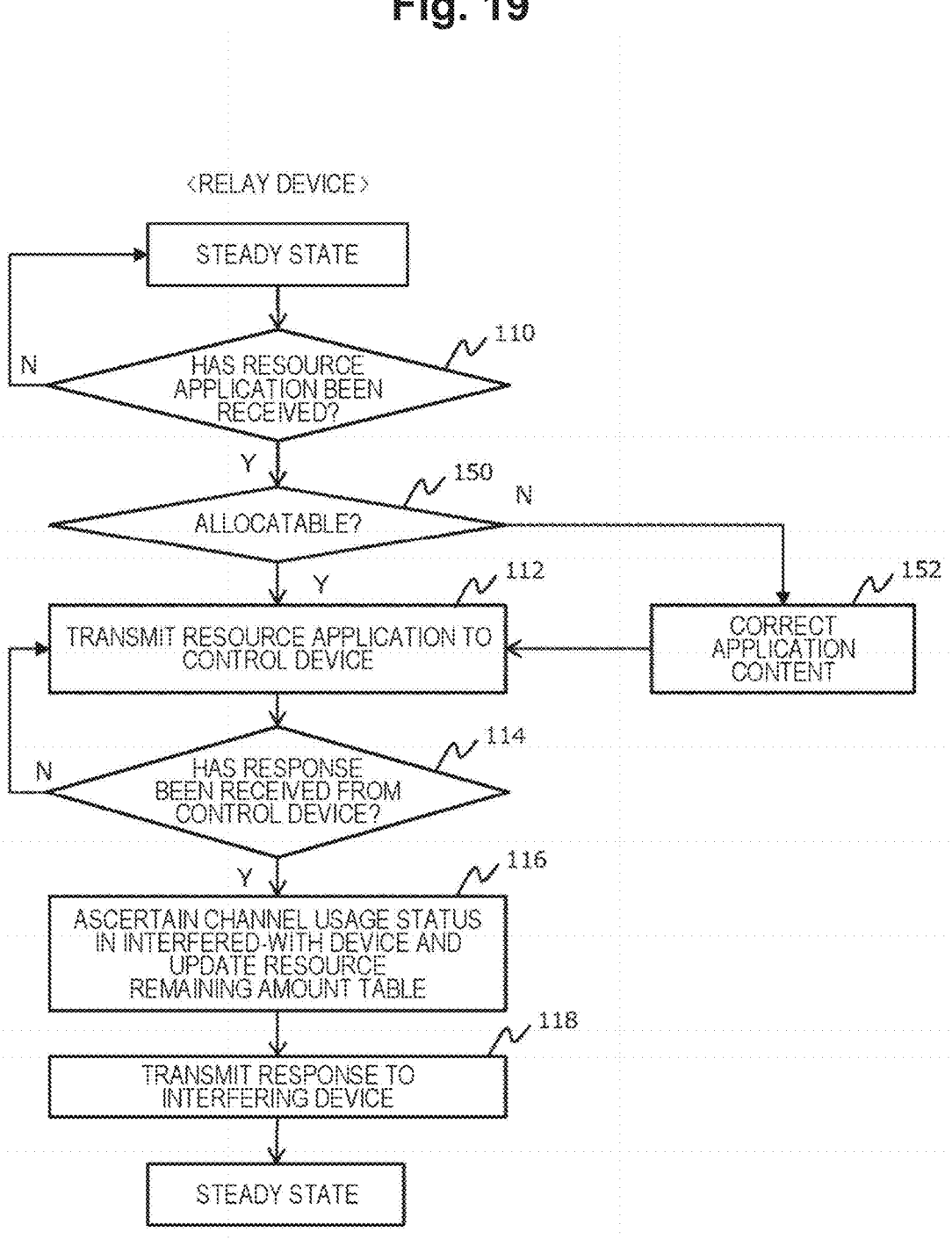
FIG. 19 is a flowchart for describing a flow of processing executed by a repeater in the fourth embodiment of the present disclosure.

FIG. 19 is a flowchart of a routine executed by the repeater 34 to implement the processes (6-3) and (6-4) above and a part of (10) above. Note that, in FIG. 19, the same steps as those illustrated in FIG. 12 are denoted by the same reference numerals, and the description thereof will be omitted or simplified.

As illustrated in FIG. 19, when the reception of the resource application is accepted in step 100, the repeater 34 of the present embodiment determines whether the resource requested by the application can be allocated (step 150). The processing in this step is performed on the basis of the latest resource remaining amount table updated in step 116 illustrated in FIG. 12. As a result, in a case where it is recognized that the content of the resource application received this time can be allocated in light of the resource remaining amount table, the processing of step 112 and subsequent steps is executed as it is.

On the other hand, in a case where it is determined in step 150 above that the content of the resource application cannot be allocated in light of the resource remaining amount table, the application content is corrected (step 152). Specifically, the frequency channel requested by the resource application is changed to a channel having the maximum resource remaining amount in the resource remaining amount table. Further, it is determined whether the transmission power for which the resource application is requested falls within the resource remaining amount of the changed channel. Then, in a case where the determination is negative, the transmission power related to the application is lowered so as to be within the resource remaining amount of the changed channel.

Thereafter, by the processing in step 112 to 118, the resource application accepted by the repeater 34 is transmitted to the control device 14, and a response to the resource application is returned to the interfering device 30. In this case, the interfering device 30 receives a response suitable for the restriction of the resource remaining amount table. Therefore, in the present embodiment as well, three points of protection of the interfered-with device 10, avoidance of useless applications and responses, and efficient resource utilization can be implemented as in the case of the third embodiment.

Fifth Embodiment

Next, a fifth embodiment of the present disclosure will be described with reference to FIGS. 20 and 21 together with FIGS. 2 to 4, 8, and 12. The interference control system of the present embodiment can be implemented by the hardware configuration illustrated in FIGS. 2 to 4 as in the case of the first embodiment. Furthermore, in the present embodiment, the repeater 34 executes the routine illustrated in FIG. 8 and the routine illustrated in FIG. 12 described above, as in the case of the second embodiment. Accordingly, in the present embodiment as well, the repeater 34 generates a resource remaining amount table similar to that of the second embodiment.

Features of Fifth Embodiment

Figure 20:
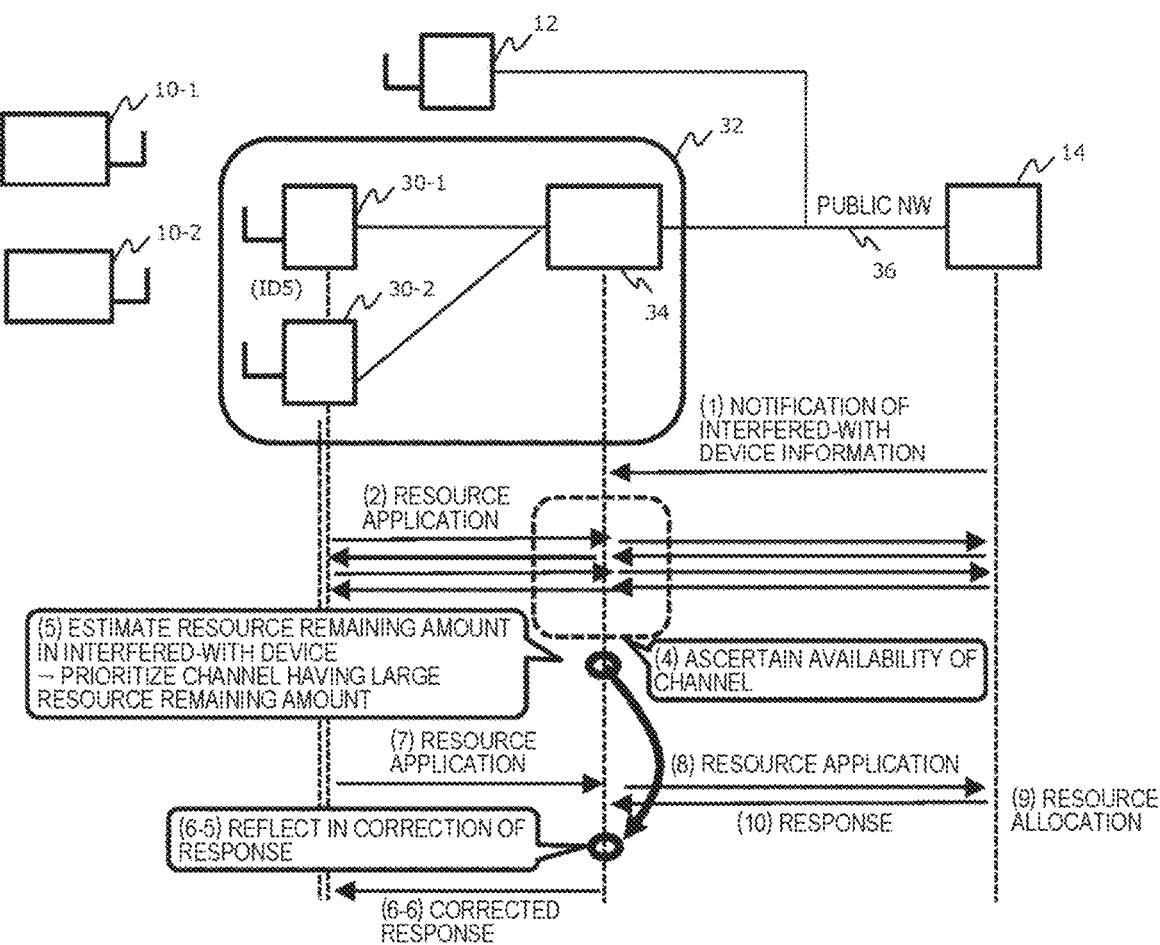
FIG. 20 is a diagram for describing features of an interference control system of a fifth embodiment of the present disclosure.

FIG. 20 is a diagram for specifically describing a flow of processing executed in the present embodiment in order to reflect the content of the resource remaining amount table in the resource application or response. Note that, in FIG. 20, elements or processes corresponding to those illustrated in FIG. 9 are denoted by the same reference numerals, and the description thereof will be omitted or simplified.

FIG. 20 specifically illustrates that the processing described below is executed in time series in the interference control system of the present embodiment.

(1) to (5): A resource remaining amount table is generated in a procedure similar to that in the second embodiment.

(7) to (10): The repeater 34 transmits the resource application issued by the interfering device 30 to the control device 14, and the control device 14 returns a response to the resource application to the repeater 34.

(6-5): The repeater 34 corrects the received response according to the restriction of the resource remaining amount table.

(6-6): The repeater 34 transmits the corrected response to the interfering device 30.

Figure 21:
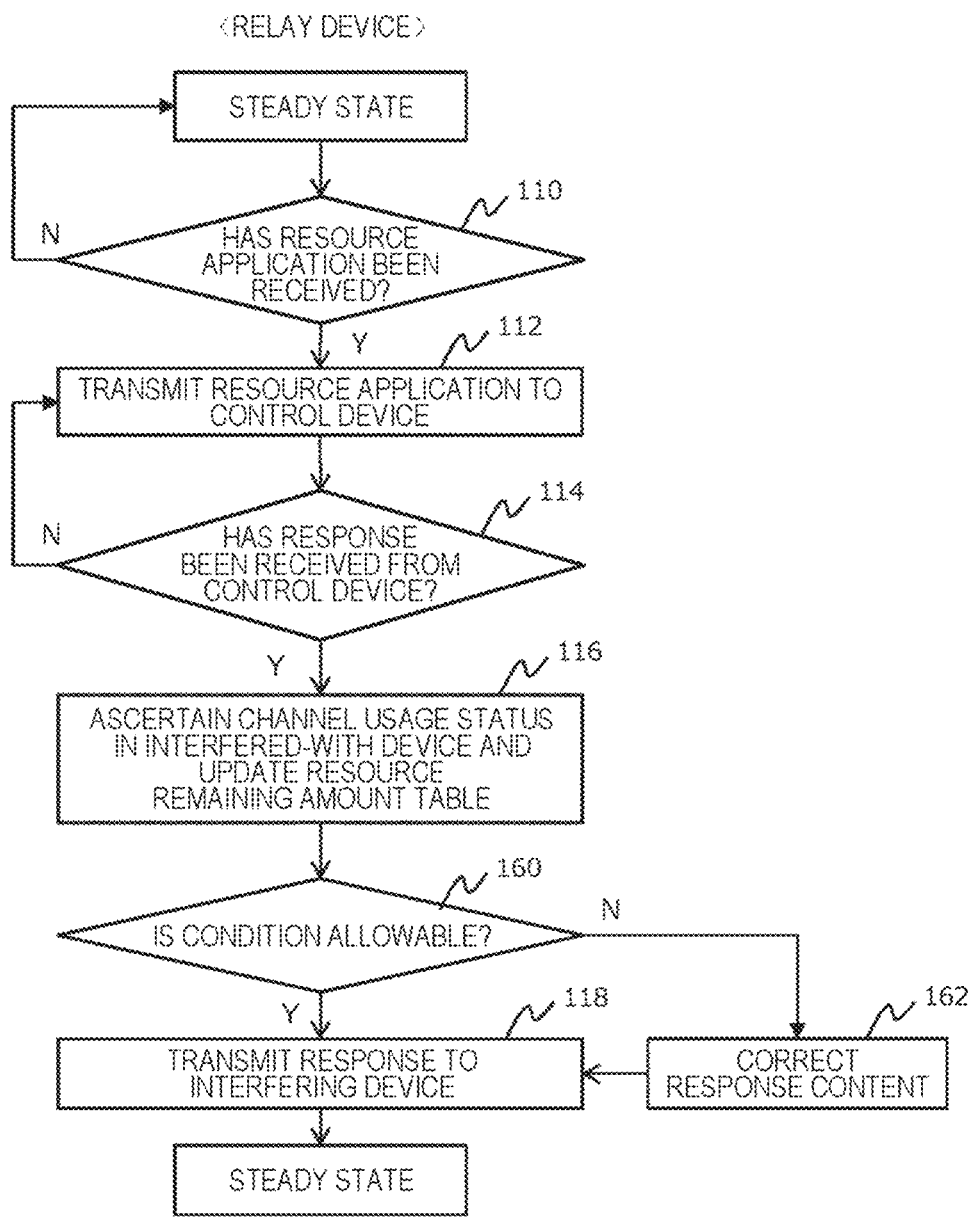
FIG. 21 is a flowchart for describing a flow of processing executed by a repeater in the fifth embodiment of the present disclosure.

FIG. 21 is a flowchart of a routine executed by the repeater 34 to implement the process (8) above and the processes (6-5) and (6-6) above. Note that, in FIG. 21, the same steps as those illustrated in FIG. 12 are denoted by the same reference numerals, and the description thereof will be omitted or simplified.

As illustrated in FIG. 21, after the response is received in step 114 and the update of the resource remaining amount table is completed in step 116, the repeater 34 of the present embodiment determines whether the condition of the response is allowable in light of the resource remaining amount table (step 160). As a result, in a case where the condition of the response received this time is allowable, the processing of step 118 and subsequent steps is executed as it is.

On the other hand, in step 160 above, in a case where it is determined that the content of the received response is not allowable in light of the resource remaining amount table, the content of the response is corrected (step 162). Specifically, the frequency channel included in the response is changed to the channel having the maximum resource remaining amount in the resource remaining amount table. Further, it is determined whether the transmission power accepted by the response falls within the resource remaining amount of the changed channel. Then, in a case where the determination is negative, the transmission power included in the response is lowered so as to be within the resource remaining amount of the changed channel.

Thereafter, by the processing of step 118, the response accepted by the repeater 34 is provided to the interfering device 30. In this case, the interfering device 30 receives a response suitable for the restriction of the resource remaining amount table. Therefore, in the present embodiment as well, three points of protection of the interfered-with device 10, avoidance of useless applications and responses, and efficient resource utilization can be implemented as in the case of the third embodiment.

REFERENCE NUMERALS LIST

10, 10-1, 10-2, 10-3 Interfered-with device
12, 12-1 to 12-5, 30, 30-1 to 30-4 Interfering device
14 Control device
32 Carrier network (carrier NW)
34 Repeater
36 Public network (public NW)
50 Control unit
52 Information storage unit

The invention claimed is:

1. An interference control system for wireless communication, the interference control system comprising a controller that controls an amount of interference to which an interfered-with wireless communicator whose wireless communication is to be protected is subjected by a plurality of interfering wireless communicators that perform wireless communication, wherein a repeater disposed between the interfering wireless communicator and the controller includes a processor and a memory storing a program executed by the processor, and the program instructs the processor to execute:

a process of providing controller disposed in a public network with a resource application based on a message issued regarding use of a wireless resource by an interfering wireless communicator disposed in a carrier network;

a process of providing a response based on a message issued by the controller in response to the resource application to the interfering wireless communicator that has issued the resource application;

a process of acquiring registration information about some or all of used frequency channels, a position, an antenna gain, and an allowable amount of interference of the interfered-with wireless communicator;

a process of acquiring information about some or all of a position, a transmission power, an antenna gain, and available frequency channels of the interfering wireless communicator;

an increase amount estimation process of estimating an increase amount in a total amount of interference caused in each of the used frequency channels of the interfered-with wireless communicator in a case where the interfering wireless communicator performs transmission in each of the frequency channels with the transmission power; and a reflection process that performs, to address the increase amount, any of:

a-1) reflecting an estimation result of the increase amount in a form of limitation in the resource application from the interfering wireless communicator, a-2) reflecting the estimation result in a form of correction in the resource application, a-3) reflecting the estimation result in the form of both the limitation and the correction in the resource application, b) reflecting the estimation result in the form of correction in the response to the interfering wireless communicator, and c) reflecting the estimation result in the form of correction in both the resource application and the response to the interfering wireless communicator.

2. The interference control system for wireless communication according to claim 1, wherein the processor further executes:

a process of accumulating contents of messages included in the resource application issued by the interfering wireless communicator and the response issued by the controller in the memory;

a process of estimating a frequency usage status of each of the plurality of interfering wireless communicators based on the accumulated contents of the messages; and a process of estimating a frequency channel availability status that reflects a result of estimating, for each frequency channel, a total amount of interference received by each of interfered-with wireless communicators that receive interference from at least one of the interfering wireless communicators belonging to the repeater under the frequency usage status, the increase amount estimation process includes a process of estimating the increase amount for an interfering wireless communicator that is newly started to be used or updated, the reflection process includes:

a process of generating a resource remaining amount table by superimposing an estimation result of the increase amount on the frequency channel availability status;

a channel selection process of selecting a priority frequency channel to be prioritized for use based on the resource remaining amount table; and a channel reflection process of reflecting the priority frequency channel in at least one of the resource application and the response.

3. The interference control system for wireless communication according to claim 2, wherein the channel selection process includes a process of estimating a resource remaining amount in the priority frequency channel based on the resource remaining amount table, and the channel reflection process includes a process of providing the priority frequency channel and information about the resource remaining amount to the interfering wireless communicator belonging to the repeater, and causing the interfering wireless communicator to generate a resource application suitable for the priority frequency channel and the resource remaining amount.

4. The interference control system for wireless communication according to claim 2, wherein the channel selection process includes a process of estimating a resource remaining amount in the priority frequency channel based on the resource remaining amount table, and the channel reflection process includes a process of correcting the resource application received from the interfering wireless communicator belonging to the repeater to a resource application suitable for the priority frequency channel and the resource remaining amount and transmitting the corrected resource application to the controller.

5. The interference control system for wireless communication according to claim 2, wherein the channel selection process includes a process of estimating a resource remaining amount in the priority frequency channel based on the resource remaining amount table, and the channel reflection process includes a process of correcting the response received from the controller to a response suitable for the priority frequency channel and the resource remaining amount and transmitting the corrected response to the interfering wireless communicator belonging to the repeater.

6. An interference control method for wireless communication using a controller that controls an amount of interference to which an interfered-with wireless communicator whose wireless communication is to be protected is subjected by a plurality of interfering wireless communicators that perform wireless communication, the interference control method comprising:

providing a controller disposed in a public network with a resource application based on a message issued regarding use of a wireless resource by an interfering wireless communicator disposed in a carrier network;

providing a response based on a message issued by the controller in response to the resource application to the interfering wireless communicator that has issued the resource application;

acquiring registration information about some or all of used frequency channels, a position, an antenna gain, and an allowable amount of interference of the interfered-with wireless communicator;

acquiring information about some or all of a position, a transmission power, an antenna gain, and available frequency channels of the interfering wireless communicator;

estimating an increase of an increase amount in a total amount of interference caused in each of the used frequency channels of the interfered-with wireless communicator in a case where the interfering wireless communicator performs transmission in each of the frequency channels with the transmission power; and performing, to address the increase amount, any one of:

a-1) reflecting an estimation result of the increase amount in a form of limitation in the resource application from the interfering wireless communicator, a-2) reflecting the estimation result in a form of correction in the resource application, a-3) reflecting the estimation result in the form of both the limitation and the correction in the resource application, b) reflecting the estimation result in the form of correction in the response to the interfering wireless communicator, and c) reflecting the estimation result in the form of correction in both the resource application and the response to the interfering wireless communicator.

7. A repeater for wireless communication using a controller that controls an amount of interference to which an interfered-with device whose wireless communication is to be protected is subjected by a plurality of interfering wireless communicators that perform wireless communication, the repeater comprising:

a processor; and a memory storing a program executed by the processor, wherein the program instructs the processor es to execute:

a process of providing a controller disposed in a public network with a resource application based on a message issued regarding use of a wireless resource by an interfering wireless communicator disposed in a carrier network;

a process of providing a response based on a message issued by the controller in response to the resource application to the interfering wireless communicator that has issued the resource application;

a process of acquiring registration information about some or all of used frequency channels, a position, an antenna gain, and an allowable amount of interference of the interfered-with wireless communicator;

a process of acquiring information about some or all of a position, a transmission power, an antenna gain, and available frequency channels of the interfering wireless communicator;

an increase amount estimation process of estimating an increase amount in a total amount of interference caused in each of the used frequency channels of the interfered-with wireless communicator in a case where the interfering wireless communicator performs transmission in each of the frequency channels with the transmission power; and a reflection process that performs, to address the increase amount, any one of:

a-1) reflecting an estimation result of the increase amount in a form of limitation in the resource application from the interfering wireless communicator, a-2) reflecting the estimation result in a form of correction in the resource application, a-3) reflecting the estimation result in the form of both the limitation and the correction in the resource application, b) reflecting the estimation result in the form of correction in the response to the interfering wireless communicator, and c) reflecting the estimation result in the form of correction in both the resource application and the response to the interfering wireless communicator.

8. A non-transitory program storage device readable by machine for wireless communication for realizing the repeater according to claim 7, the program instructs a processor to execute:

a process of providing a controller disposed in a public network with a resource application based on a message issued regarding use of a wireless resource by an interfering wireless communicator disposed in a carrier network;

a process of providing a response based on a message issued by the controller in response to the resource application to the interfering wireless communicator that has issued the resource application;

a process of acquiring registration information about some or all of used frequency channels, a position, an antenna gain, and an allowable amount of interference of the interfered-with wireless communicator;

a process of acquiring information about some or all of a position, a transmission power, an antenna gain, and available frequency channels of the interfering wireless communicator;

an increase amount estimation process of estimating an increase amount in a total amount of interference caused in each of the used frequency channels of the interfered-with wireless communicator in a case where the interfering wireless communicator performs transmission in each of the frequency channels with the transmission power; and a reflection process that performs, to address the increase amount, any one of:

a-1) reflecting an estimation result of the increase amount in a form of limitation in the resource application from the interfering wireless communicator, a-2) reflecting the estimation result in a form of correction in the resource application, a-3) reflecting the estimation result in the form of both the limitation and the correction in the resource application, b) reflecting the estimation result in the form of correction in the response to the interfering wireless communicator, and c) reflecting the estimation result in the form of correction in both the resource application and the response to the interfering wireless communicator.

* * * * *